US012737419B2

(12) United States Patent
Kharbanda et al.

(10) Patent No.: US 12,737,419 B2
(45) Date of Patent: Sep. 15, 2026

(54) SYSTEM AND METHODS FOR PROVIDING A LIVE QUERY RESPONSE SESSION

(71) Applicant: Google LLC, Mountain View, CA (US)

(72) Inventors: Harshit Kharbanda, Pleasanton, CA (US); Christopher James Kelley, Orinda, CA (US); Kai Yu, San Francisco, CA (US); Christophe Patrice Fondacci, Daly City, CA (US); Swaminathan Pichumani, San Jose, CA (US); Wewage Anuda Nethum Dep Weerasinghe, San Francisco, CA (US); Jing Cao, Palo Alto, CA (US); Hsiang-Yu Yang, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 19/003,352

(22) Filed: Dec. 27, 2024

(65) Prior Publication Data

US 2026/0187142 A1 Jul. 2, 2026

(51) Int. Cl.
*G06F 16/735* (2019.01)
*G06F 16/732* (2019.01)
*G06F 16/738* (2019.01)

(52) U.S. Cl.
CPC .......... *G06F 16/735* (2019.01); *G06F 16/732* (2019.01); *G06F 16/738* (2019.01)

(58) Field of Classification Search
None
See application file for complete search history.

(56) References Cited

U.S. PATENT DOCUMENTS 10,909,114 B1 * 2/2021 Virtuoso ............. G06F 16/2282
2007/0078842 A1 * 4/2007 Zola ...................... G06F 16/951
(Continued)

FOREIGN PATENT DOCUMENTS

CN 107894840 A 4/2018
EP 3811854 A2 4/2021

OTHER PUBLICATIONS

Allen et al., "Plow: A Collaborative Task Learning Agent", Twenty-Second Conference on Artificial Intelligence, Vancouver, British Columbia, Canada, Jul. 22-26, 2007, pp. 1514-1519.
(Continued)

*Primary Examiner* — Richard L Bowen
(74) *Attorney, Agent, or Firm* — DORITY & MANNING, P.A.

(57) ABSTRACT

Provided is a system for providing a live query response session for responding to multimodal input queries. A computing system initiates a live query response session. While conducting the live query response session, the computing system receives a multimodal input query. The computing system determines, by an orchestration model, one or more information retrieval steps to acquire additional information associated with the multimodal input query, wherein the information retrieval steps include a clarifying question requesting additional information from the user. The computing system provides the clarifying question to the user computing device. The computing system receives a user response to the clarifying question in real time. The computing system generates model input based on the multimodal input query and the user response. The computing system processes the model input with a query response model to generate a model output.

19 Claims, 16 Drawing Sheets

(56) References Cited

U.S. PATENT DOCUMENTS

| | | | | |
|---|---|---|---|---|
| 2015/0135310 | A1 | 5/2015 | Lee | |
| 2015/0293928 | A1* | 10/2015 | Chen | G06F 16/738 707/738 |
| 2022/0366153 | A1* | 11/2022 | Li | G06F 16/24578 |
| 2024/0281472 | A1* | 8/2024 | LaRhette | G06F 16/9558 |
| 2025/0036887 | A1* | 1/2025 | Sukhija | G06F 40/205 |
| 2025/0200050 | A1* | 6/2025 | Tenkale | G06F 16/24568 |
| 2025/0225559 | A1* | 7/2025 | Quah | G06Q 30/0631 |

OTHER PUBLICATIONS

Anthony et al., "Thinking Fast and Slow with Deep Learning and Tree Search", Thirty-First International Conference on Neural Information Processing Systems, Long Beach, California, United States, Dec. 4-9, 2017, 11 pages.

Bahdanau et al., "Learning to Understand Goal Specifications by Modeling Reward", Seventh International Conference on Learning Representations, New Orleans, Louisiana, United States, May 6-9, 2019, 19 pages.

Baker et al., "Video PreTraining (VPT): Learning to Act by Watching Unlabeled Online Videos", Thirty-Sixth Conference on Neural Information Processing Systems, New Orleans, Louisiana, United States, Nov. 28-Dec. 9, 2022, 16 pages.

Branavan et al., "Reading Between the Lines: Learning to Map High-Level Instructions to Commands", Forty-Eighth Annual Meeting of the Association for Computational Linguistics, Uppsala, Sweden, Jul. 11-16, 2010, pp. 1268-1277.

Burns et al., "Interactive Mobile App Navigation with Uncertain or Under-Specified Natural Language Commands", arXiv:2202.02312v1, Feb. 4, 2022, 22 pages.

Chung et al., "Scaling Instruction-Finetuned Language Models", arXiv:2210.11416v5, Dec. 6, 2022, 54 pages.

Coulom, "Efficient Selectivity and Backup Operators in Monte-Carlo Tree Search", Fifth International Conference on Computers and Games, Turin, Italy, May 29-31, 2006, 12 pages.

Dosovitskiy et al., "An Image Is Worth 16×16 Words: Transformers for Image Recognition ay Scale", arXiv:2010.11929v2, Jun. 3, 2021, 22 pages.

Du et al., "Vision-Language Models as Success Detectors", arXiv:2303.07280v1, Mar. 13, 2023, 22 pages.

Furuta et al., "Instruction-Finetuned Foundation Models for Multimodal Web Navigation", 2023 International Conference on Learning Representations Workshop on Mathematical and Empirical Understanding of Foundation Models, Kigali, Rwanda, May 4, 2023, 28 pages.

Gur et al., "Learning to Navigate the Web", arXiv:1812.09195v1, Dec. 21, 2018, 12 pages.

Humphreys et al., "A Data-Driven Approach for Learning to Control Computers", Thirty-Ninth International Conference on Machine Learning, Baltimore, Maryland, United States, Jul. 17-23, 2022, 17 pages.

Jia et al., "DOM-Q-Net: Grounded RL on Structured Language", Seventh International Conference on Learning Representations, New Orleans, Louisiana, United States, May 6-9, 2019, 17 pages.

Kim et al., "Language Models can Solve Computer Tasks", arXiv:2303.1749v3, Nov. 16, 2023, 30 pages.

Lee et al., "Pix2Struct: Screenshot Parsing as Pretraining for Visual Language Understanding", Fortieth International on Machine Learning, Honolulu, Hawaii, United States, Jul. 23-29, 2023, 20 pages.

Li et al., "Mapping Natural Language Instructions to Mobile UI Action Sequences", arXiv:2005.03776v2, Jun. 5, 2020, 13 pages.

Li et al., "Spotlight: Mobile UI Understanding Using Vision-Language Models with a Focus", 2023 International Conference on Learning Representations, Kigali, Rwanda, May 1-5, 2023, 16 pages.

Li et al., "Widget Captioning: Generating Natural Language Description for Mobile User Interface Elements", 2020 Conference on Empirical Methods in Natural Language Processing, Virtual, Nov. 16-20, pp. 5495-5510.

Liu et al., "Reinforcement Learning on Web Interfaces Using Workflow-Guided Exploration", arXiv:1802.08802v1, Feb. 24, 2018, 15 pages.

Mnih et al., "Human-Level Control Through Deep Reinforcement Learning", Nature, vol. 518, Feb. 25, 2015, 13 pages.

Nakano et al., "WebGPT: Browser-Assisted Question-Answering with Human Feedback", arXiv:2112.09332v3, Jun. 1, 2022, 32 pages.

Raffel et al., "Exploring the Limits of Transfer Learning with a Unified Text-to-Text Transformer", arXiv:1910.10683v4, Sep. 19, 2023, 67 pages.

Schulman et al., "Proximal Policy Optimization Algorithms", arXiv:1707.06347v2, Aug. 28, 2017, 12 pages.

Shaw et al., "From Pixels to UI Actions: Learning to Follow Instructions via Graphical User Interfaces", arXiv:2306.00245v2, Dec. 6, 2023, 17 pages.

Shazeer et al., "Adafactor: Adaptive Learning Rates with Sublinear Memory Cost", Thirty-Fifth International Conference on Machine Learning, Stockholm, Sweden, Jul. 10-15, 2018, 9 pages.

Shi et al., "World of Bits: An Open-Domain Platform for Web-Based Agents", Thirty-Fourth International Conference on Machine Learning, Sydney, New South Wales, Australia, Aug. 6-11, 2017, 10 pages.

Silver et al., Mastering the Game of Go Without Human Knowledge, Nature, vol. 550, Oct. 19, 2017, 18 pages.

Vaswani et al., "Attention Is All You Need", Thirty-First Conference on Neural Information Processing System, Long Beach, California, United States, Dec. 4-9, 2017, 11 pages.

Wang et al., "Screen2Words: Automatic Mobile U1 Summarization with Multimodal Learning", Thirty-Fourth Annual Association for Computing Machinery Symposium on User Interface Software and Technology, Virtual, Oct. 10-14, 2021, pp. 498-510.

Williams, "Simple Statistical Gradient-Following Algorithms for Connectionist Reinforcement Learning", Machine Learning, vol. 8, May 1992, pp. 229-256.

Wu et al., "Google's Neural Machine Translation System: Bridging the Gap Between Human and Machine Translation", arXiv:1609.08144v2, Oct. 8, 2016, 23 pages.

Yao et al., "ReAct: Synergizing Reasoning and Acting in Language Models", 2023 International Conference on Learning Representations, Kigali, Rwanda, May 1-5, 2023, 33 pages.

Yao et al., "WebShop: Towards Scalable Real-World Web Interaction with Grounded Language Agents", Thirty-Sixth Conference on Neural Information Processing Systems, New Orleans, Louisiana, United States, Nov. 28-Dec. 9, 2022, 14 pages.

Zettlemoyer et al., "A Visual Medium for Programmatic Control of Interactive Applications", 1999 Association for Computing Machinery Special Interest Group Special Interest Group on Computer-Human Interaction Conference on Human Factors in Computing Systems, Pittsburgh, Pennsylvania, United States, May 15-20, 1999, pp. 199-206.

* cited by examiner

SYSTEM AND METHODS FOR PROVIDING A LIVE QUERY RESPONSE SESSION

FIELD

The present disclosure relates generally to sequence processing models. More particularly, the present disclosure relates to a system that provides a live multimodal session for receiving multimodal queries in real time and providing a conversational experience to a user including clarifying questions.

BACKGROUND

As the capability of large language machine-learned models to generate content in response to a prompt continues to increase, there is demand for machine-learned models that can respond to increasingly complicated prompts quickly and efficiently. However, with large complicated multimodal prompts, it can be difficult and time consuming for users to get a satisfactory response from the machine-learned model. The process is made more difficult when the query is complicated. Complicated queries may require more information than is available in the prompt. It is therefore important to respond to complex prompts in a matter that enables the large language machine-learned models to retrieve additional information as needed while ensuring that the computational cost is not unreasonably increased.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can be performed by a computing system comprising one or more processors. The method comprises initiating, by a computing system with one or more processors, a live query response session with a computing device associated with a user. The method further comprises, while conducting the live query response session, receiving, by the computing system, a multimodal input query from the computing device, wherein the multimodal input query includes video content. The method further comprises determining, by an orchestration model executing on the computing system, one or more information retrieval steps to acquire additional information associated with the multimodal input query, wherein the information retrieval steps include a clarifying question requesting additional information from the user. The method further comprises providing, by the computing system, the clarifying question to the user computing device. The method further comprises receiving, by the computing system, a user response to the clarifying question, wherein the user response is received in real-time. The method further comprises generating, by the computing system, model input based on the multimodal input query and the user response. The method further comprises processing, by the computing system, the model input with a query response model to generate a model output based on the model input. The method further comprises transmitting, by the computing system, the model output for display at a user computing device.

Another example aspect of the present disclosure is directed to a computing system for providing a live query response system. The system can include one or more processors and one or more non-transitory computer-readable media that collectively store instructions that, when executed by the one or more processors, cause the computing system to perform operations. The operations can include initiating a live query response session with a computing device associated with a user. The operations comprise, while conducting the live query response session, receiving a multimodal input query from the computing device, wherein the multimodal input query includes video content. The operations comprise determining, by an orchestration model, one or more information retrieval steps to acquire additional information associated with the multimodal input query, wherein the information retrieval steps include a clarifying question requesting additional information from the user. The operations further comprise providing the clarifying question to the user computing device. The operations further comprise receiving a user response to the clarifying question, wherein the user response is received in real-time. The operations further comprise generating model input based on the multimodal input query and the user response. The operations further comprise processing the model input with a query response model to generate a model output based on the model input. The operations comprise transmitting the model output for display at a user computing device.

Another example aspect of the present disclosure is directed to one or more non-transitory computer-readable media that collectively store instructions that, when executed by one or more computing devices, cause the one or more computing devices to perform operations. The operations can include initiating a live query response session with a computing device associated with a user. The operations comprise, while conducting the live query response session, receiving a multimodal input query from the computing device, wherein the multimodal input query includes video content. The operations comprise determining, by an orchestration model, one or more information retrieval steps to acquire additional information associated with the multimodal input query, wherein the information retrieval steps include a clarifying question requesting additional information from the user. The operations further comprise providing the clarifying question to the user computing device. The operations further comprise receiving a user response to the clarifying question, wherein the user response is received in real-time. The operations further comprise generating model input based on the multimodal input query and the user response. The operations further comprise processing the model input with a query response model to generate a model output based on the model input. The operations comprise transmitting the model output for display at a user computing device.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
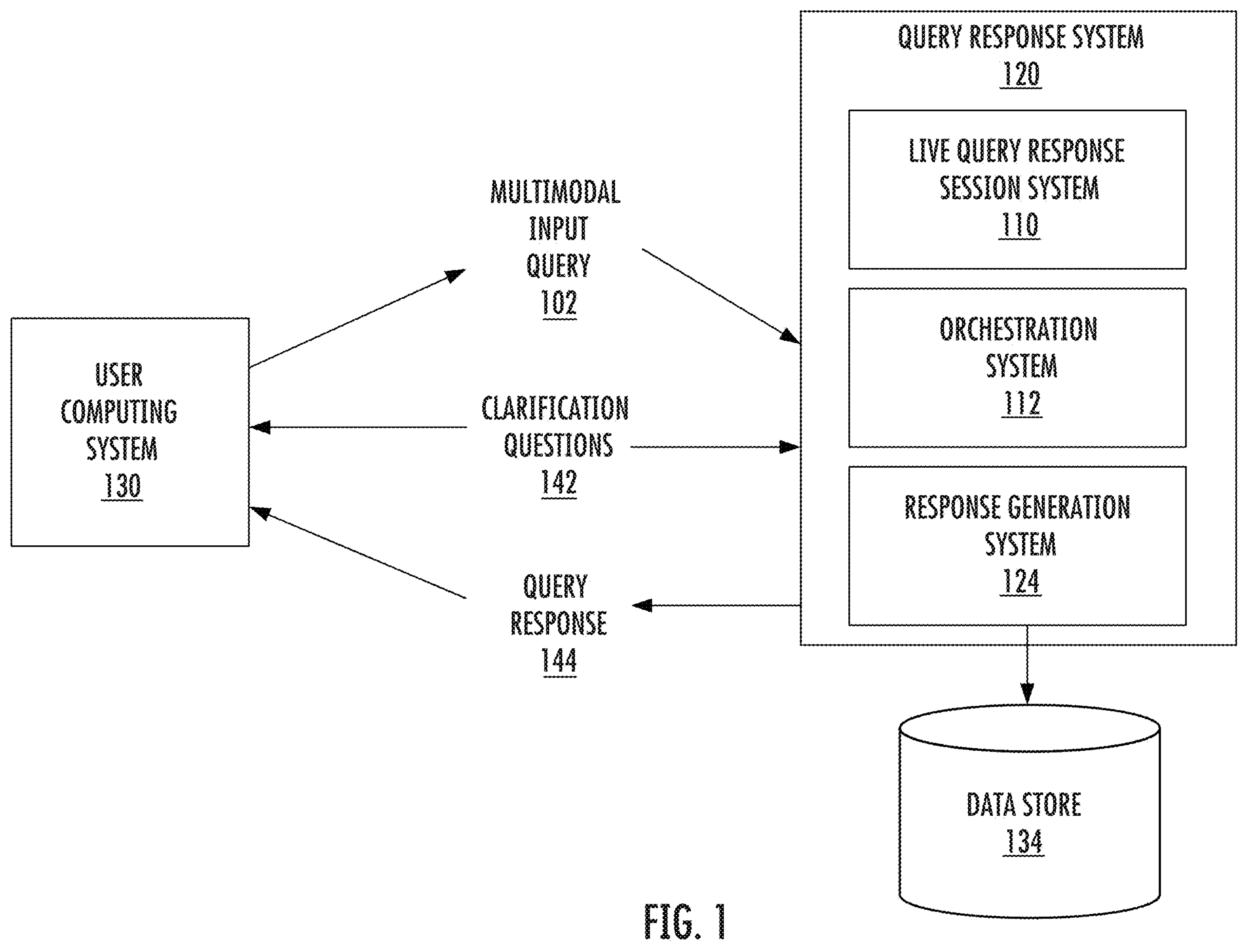
FIG. 1 represents an example of a live query response system for responding to multimodal input queries during a live query response session in accordance with example embodiments of the present disclosure.

Reference numerals that are repeated across plural figures are intended to identify the same features in various implementations.

DETAILED DESCRIPTION

Generally, the present disclosure is directed toward a query response system that facilitates live multimodal query response sessions. To do so, a query response system can be associated with an image processing and recognition application capable of recording imagery (e.g., video), presenting imagery (e.g., images or video) on the screen of a user computing device, and receiving queries from users during a live response session. Thus, a user can submit one or more multimodal query requests while recording or displaying a video. The multimodal query request can include text or audio provided by the user and image data (e.g., single-frame images or videos) displayed by the application when the multimodal input is submitted. The query response system can analyze the multimodal input query. This analysis can include providing the multimodal input query to an orchestration model. Based on the multimodal input query, the orchestration model can determine one or more steps for the live query response system.

In some examples, the live query response system can determine that more information is needed from the user to determine an appropriate response. If so, the live query response system can generate one or more clarifying questions for the user. Clarifying questions can be provided to the user during the live session. In this way, the user experiences a more natural conversational interaction with the live query response system in which the user asks questions and provides information as needed by the live query response system. If the orchestration system determines that sufficient information has been received from the user, the orchestration system can provide a response. In some examples, the orchestration system can access information via web search to supplement information provided by the user and known by the model. The query response can include a plurality of steps. Each step can include clarifying questions for the user and customized responses based on information provided by the user (e.g., what the user remembers and knows).

For example, the user can initiate a live query response session. During the live query response session, the user can transmit a multimodal input query, including an image or video of a glucose monitoring application or device. The user can submit (e.g., via input text or spoken audio) the query, "Why did my glucose go up after I exercised?" The query response system can analyze the query, and any images or video included in the multimodal input query. Based on that analysis (e.g., the output of an orchestration model), the query response system can determine that glucose rise after exercise is unusual but that without additional information specific to the user and his exercise, it would be difficult to generate a complete and useful response. As a result, the query response system can transmit a clarifying question to the user as part of the live query response session. The clarifying question can include text that reads or audio that says, "It is not typical for glucose to rise after exercise. Can you tell me more about the type of exercise you were doing and how long you were doing it for?" The user can respond to this question with additional information if they wish. For example, the user can say, "I was doing intense cardio for 30 minutes and my heartbeat was over 160 beats per minute." The query response system can follow up by saying, "Thank you. With that information, I was able to do a web search and found the following information that may be helpful." A complete query response can be presented based on the additional information provided by the user. This conversational style of interaction can keep the user engaged and retrieve further information needed to provide a useful response.

More particularly, a live query response system can be associated with an application that can capture video or images, receive input from a user, and interact as part of a live query response session. For example, the application can be an application that captures video and allows users to ask questions about the captured video. During the live query response session, a user can provide one or more multimodal input queries. The multimodal input queries can include voice or text queries from a user as well as imagery or video captured by the user computing device. The captured imagery can be displayed on the screen of the user computing device. For example, the user can capture a video of an engine and ask a question about a portion of the engine displayed in the video. For example, if the engine image includes the battery, the user can ask how to set up charging cables to jumpstart a vehicle correctly.

A multimodal input query can be an input query that includes at least two types of content. In general, the input query can include textual content (e.g., a natural language question), speech content (a recording of a user asking a question), and one or more media elements (e.g., an image, a video, a piece of audio content, etc.). Once the multimodal input query has been received from the user, the live query response system can provide the multimodal input query to an orchestration system. An orchestration system can be a system that includes one or more machine-learned models. A particular machine-learned model in the orchestration system can be trained to take information from a multimodal input query as input and, in response, generate one or more steps to be taken by the live query session system to generate a response to the multimodal input query.

In this example, the orchestration system can include a machine-learned model trained to determine whether the orchestration system has sufficient information to generate an accurate response based on the multimodal input query (and any other contextual information). In some examples, the orchestration system includes a machine-learned model trained to identify the particular information that may be missing in the query. The machine-learned model can determine whether additional information is required to respond to the request accurately and whether that information is best received from the user or a general knowledge source associated with web searching. For example, information about the specific situation may be best received from a user. In contrast, general knowledge not associated with the specific multimodal input query may best be retrieved via a web query of a database of general data.

If the orchestration system determines that a user is the best source for particular missing information, the orchestration system can generate one or more clarifying questions. Clarifying questions can be questions designed to elicit missing information from the user. For example, if a user has a question about where to purchase a shoe pictured in an image, the orchestration system may determine that an accurate response will be easier to generate if the user provides the user's shoe size. As a result, the orchestration system can generate clarifying questions that prompt the user to provide their shoe size.

Once one or more clarifying questions have been generated, the orchestration system can transmit the clarifying questions to the user computing device for presentation to the user. In some examples, the clarifying question can be converted into an audio format and played for the user while a live response session is ongoing. Once the question has been related to the user, the user computing device system can use audio sensors to determine whether the user has responded to the clarifying question.

In some examples, a planning machine-learned model associated with the orchestration system can determine whether to ask clarifying questions. The planning model can be tuned to ask more or fewer clarifying questions. For example, some users may prefer fewer clarifying questions. When providing a live query session to those users, the planning model can be tuned to reduce the number of overall questions asked. In other examples, users may find clarifying questions helpful, and thus, the planning model may be tuned to provide more clarifying questions.

In some examples, the orchestration system can determine that one or more pieces of missing information are not associated with the particular user or query. Instead, the missing piece of knowledge may be determined to be a general knowledge question. For example, the orchestration may determine that the multimodal input query is associated with a particular merchant but does not include the days and times the merchant is open. The orchestration system (or an associated planning model) can determine whether to respond based on existing model knowledge or to generate a search query to retrieve more matter-specific information stored in a knowledge database or from sources available via computer networks. For example, if the orchestration system determines that the sequence processing model itself does not have enough specific knowledge to answer a particular query, the orchestrator system can generate a subquery along with instructions to search a particular search database.

In some examples, the search query can be based on the original input from the user, which can be rewritten to include additional information received from the user or determined by the model itself. The search query can be executed, and specific information can be retrieved to supplement the information provided by the multimodal input query or through clarifying questions. The orchestration system can determine whether, with the additional information, the live query response system now has enough information to generate a useful response.

Once the live query response system has determined that it has enough information to generate a response, a model input can be generated for a sequence processing model. The sequence processing model can be a query response model trained to generate a model output based on the multimodal query, the answers to clarifying questions, and any information received as part of a supplemental search. In some examples, the model input can be a prompt. The prompt can include a rewritten version of the text provided by the user (either in written or verbal form), the rewritten query, and any additional context about the query (e.g., information about the user and their history with the query response system).

The sequence processing model can generate a model output that includes a response to the user input query. In some examples, the model output can include both a visual component that will be displayed on the user computing device and an audio component that can direct the user. In some examples, the visual and audio components are distinct, such that different information is included in the video and audio components. For example, the visual component can include diagrams and other visual information. In contrast, the audio component can provide instructions to the user and provide explanations for the displayed visual components. For example, the audio information can include a series of instructions about a pictured visual. For example, while explaining a math problem, the visual components can be displayed, and the audio experience can explain what is displayed while highlighting, underlining, or otherwise designating portions of the visual display. For example, if fractions are being explained, a fraction can be displayed on the screen, and an audio track can explain that a fraction is made up of a denominator and a numerator. When the audio component discusses the numerator, the corresponding part of the fraction can be highlighted (or otherwise visually distinguished). While the audio track discusses the denominator, the corresponding portion of the display fraction can be highlighted. The audio and visual portions of the model output can be distinct but can work together to provide a clear understanding of the response.

In some examples, the audio and visual information can include synchronization data that allows the two portions of data to be played at the appropriate time. For example, the synchronization data can indicate that when a particular audio line is read, a corresponding visual should be displayed.

In some examples, the orchestration system can maintain a context for the larger task. For example, the orchestration system can generate a series of steps to perform to generate a response and convey the response to a user. In some examples, the orchestration system can maintain a state machine indicating which portion of the response is being performed and what steps need to be performed in the future. In this way, if the user asks a question or requires clarification, the orchestration system can determine which portion of the response the user is currently responding to. In some examples, when performing each new step, the orchestration system can take, as input, information about the previously performed steps. This information can include information received from the user and information provided to the user. Thus, the orchestration system can generate information associated with each step as it progresses through the process.

The query response system can monitor user input at any point in the process to facilitate a more realistic live conversation. This allows the user to interrupt the information provided based on the output of the sequence processing model and provide feedback at any point in the live session when the user has questions or would like clarification. To enable the system to detect user feedback, the live query response system can continually monitor the output of the audio sensor. If the user provides verbal or input information, the live query response system can process any received input (e.g., audio information, user touch input, etc.) and give an updated response rather than continuing with the previously generated response.

In some examples, the live query session system can distinguish between background noise and audio that is part of user input (e.g., a user response to a question or an interjection seeking clarification about displayed or presented content). In some examples, the model can be trained specifically to determine when the user has started speaking and when the user has finished speaking to ensure that the user's feedback is fully heard before responding but that there is no significant delay before a response is generated.

Based on context, the live query response system can determine whether any captured audio content is relevant. For example, the position of the user computing device can be determined, and that position can be used to determine whether the user is interacting with the associated live request application or whether the user is not. If the user is determined to not be interacting with the live query response system, the captured video or audio can be determined to be not relevant. In some examples, the system can discard video input that is determined to be blank, blurry, redundant, or irrelevant.

Once the live query response system has received user feedback and received additional input for any missing information, a sequence processing system can generate a response to the multimodal input query. The response can include text or audio data that includes a natural language explanation or answer and video or image response data. The response can be transmitted to a user computing device associated with a user. In some examples, the response can be transmitted to a user computing device. The model output can be displayed in the image recording and display application. For example, the model response can be displayed in an interface element box in the application. The model response can include a summary of the information relevant to the multimodal input query.

The systems and methods of the present disclosure provide a number of technical effects and benefits. As one example, the systems and methods can reduce the latency and the number of computational resources needed to generate an accurate response to a multimodal input query in real-time. Automatically and accurately responding to user queries and feedback in a live query response session can significantly reduce the time and cost needed to produce accurate results for a machine-learned model.

Another example of technical effect and benefit relates to improved computational efficiency and improvements in the functioning of a computing system. For example, a technical benefit of the systems and methods of the present disclosure is the ability to selectively use the orchestration system to retrieve additional information only when additional information would help generate a more useful response. In this way, the more complex response system can be used when needed, but when the multimodal input query has sufficient information, the query response system can avoid the use of the more resource-intensive system. This allows the query response system to reduce power usage and processor usage of the system, while still generating responses to multimodal input queries.

With reference now to the Figures, example embodiments of the present disclosure will be discussed in further detail.

FIG. 1 represents an example of a live query response system 100 for responding to multimodal input queries 102 during a live query response session in accordance with example embodiments of the present disclosure. In this example, a query response system 120 can receive a multimodal input query 102 from a user computing system 130. The multimodal input query 102 can be multimodal and include two or more types of content. For example, the two or more types of content can include textual content and/or one or more media elements. The media elements can include image content, video content, audio content, interactive content, etc.

In some examples, the user computing system 130 can submit a request to initiate a live query response session. The request can be submitted with a multimodal input query 102. The query response system 120 can, in response to receiving a request for a live query response system, provide the multimodal input query 102 to the live response session system 110.

The live response session system 110 can access an orchestration system 112. The orchestration system 112 (or an associated machine-learned model such as an orchestrator LLM) can analyze multimodal input queries in real-time and coordinate responses to those multimodal input queries in real-time. In some examples, the orchestration system 112 can determine one or more steps to take in response to the multimodal input query 102. In some examples, the orchestration system 112 can access a classification system. The classification system can determine whether the response generation system 124 has sufficient information to respond to the multimodal input query 102. For example, the response generation system 124 can generate a provisional response, and the orchestration 112 system can evaluate the provisional response for completeness.

If the orchestration system 112 determines that the response generation system 124 does not have enough information to generate an adequate response, the orchestration system 112 can determine one or more steps to rectify the lack of information. For example, the orchestration system 112 can determine that the submitting user is the best source for retrieving the missing data based on the multimodal input query 102. For example, if the missing information is unique to the respective user (e.g., the user's current state, existing knowledge, and so on), the orchestration system 112 can generate one or more clarifying questions 142.

In contrast, if the orchestration system 112 determines that the information missing from the multimodal input query 102 is not unique to the user and is of a general nature, the orchestration system 112 can determine that the query response system 120 can access additional information from a data store 134. For example, the orchestration system 112 can generate one or more sub-queries and execute those sub-queries to retrieve information from the data store 134.

In some examples, the orchestration system 112 can perform this evaluation multiple times, requesting further clarification or generating web queries as needed. Once the orchestration system 112 determines that the query response system 120 has sufficient information to respond to the multimodal input query 102, the response generation system 124 can generate a model input based on the multimodal input query 102, any retrieved information, and any additional contextual data. The model input can be provided to the response generation system 124. In some examples, the model input can be a prompt to a sequence processing model. For example, the response generation system 124 can include a sequence processing model that is trained to generate natural language responses to multimodal input queries 102. The sequence processing model can directly take text, audio, images, and video as input and provide a model output that includes audio, video, and text. In some examples, the model output can include one or more visual aspects and one or more audio (or text) aspects.

The model output can be transmitted to the user computing system 130 as a query response 144. The query response 144 can be displayed at the user computing system 130. In some examples, both visual and audio components can be presented. The video component and the audio component can have different content, with the audio component including explanations of the video content. In this way, the user can see a visual depiction of a response, and the audio component can describe one or more important aspects of the displayed information. In some examples, the query response can include data that allows the audio and video content to be synchronized. The user computing system 130 can simultaneously display video and present related audio content.

Figure 2:
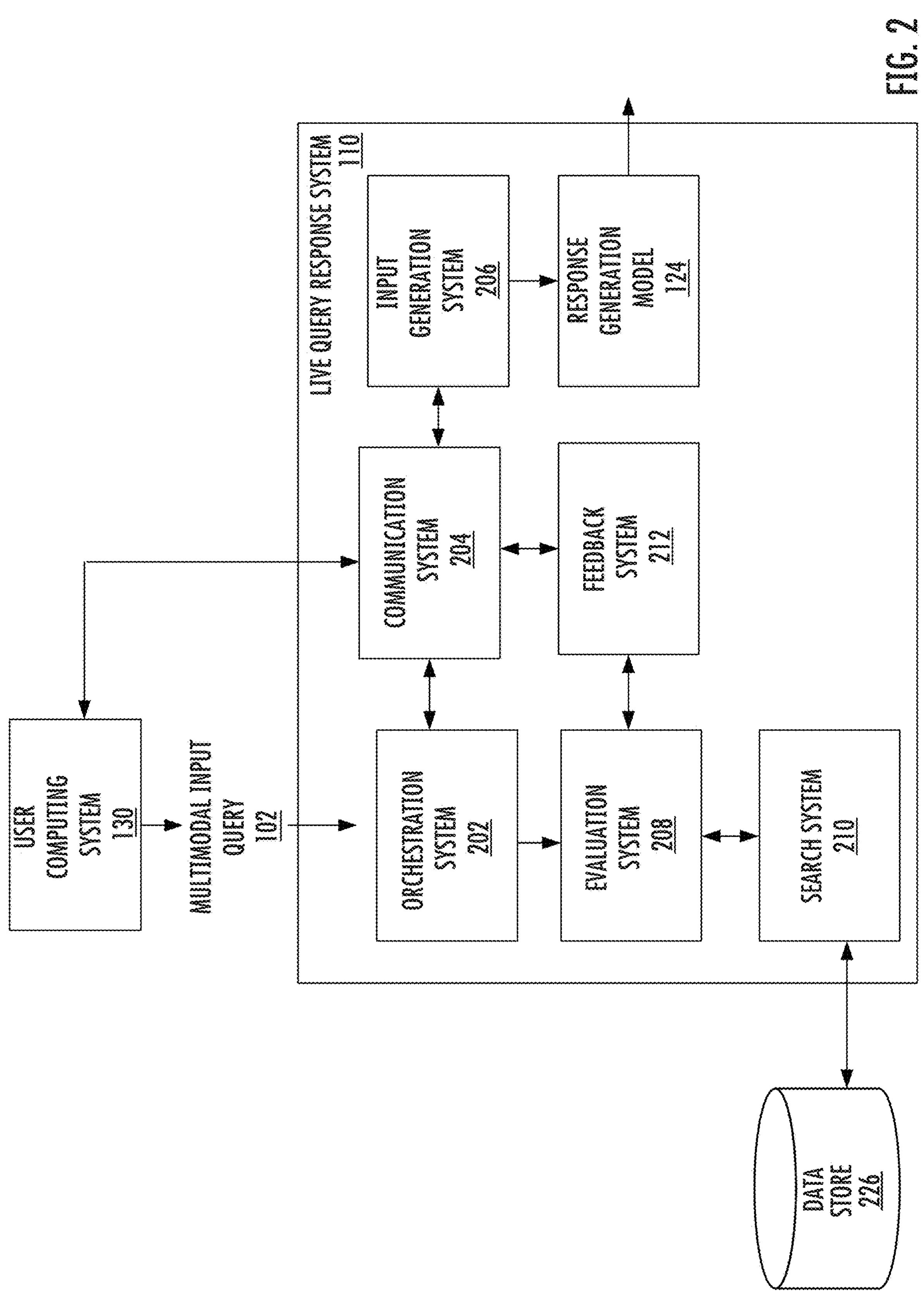
FIG. 2 depicts a live query response system in accordance with example embodiments of the present disclosure.

FIG. 2 depicts a live query response system in accordance with example embodiments of the present disclosure. In this example, the live query response session system 110 receives a multimodal input query 102 from a user computing system 130. The multimodal input query 102 can be received from the user computing system 130 while the user computing system executes an application associated with the live query response session system 110. The application can enable the user computing system 130 to capture videos or images, display those videos or images on the screen of the user computing system 130, and receive input from a user to generate a multimodal input query 102.

In some examples, the multimodal input query 102 can include text or voice input from a user (e.g., a selection of a user interface element or a spoken question). The multimodal input query 102 can also include video or image data based on the video or images displayed in the application on the user computing system 130. For example, a user can view a video in the interface of their computing device (e.g., using an image capture and display application) and submit a query about something depicted in the video. In that case, relevant portions of the video can be captured by the image capture and display application and transmitted to the query response system along with the text (or audio) of the query. The user can manually select the portions of the video to send. In other examples, the application can automatically select portions of the video to send. For example, if the user pauses the video to ask a question, the application can automatically select the paused portion or one or more previous portions and transmit those portions as part of the multimodal input query.

In some examples, the user can annotate the image or video to provide additional information about the multimodal input query 102. In some examples, the user computing system 130 can transmit, with the multimodal input query 102, a request to initiate a live query response session. In this case, the multimodal input query 102 can be submitted to the live query response session system 110. The live query response session system 110 can initiate a live query response session with the user via the user computing system 130 over a computing communication network.

In some examples, the multimodal input query 102 can be delivered to an orchestration system 202 connected to the live query response session system 110. The orchestration system 202 can process the multimodal input query 102, determine one or more subsequent steps, and generate instructions to other subsystems to execute those steps. In this case, the live query response session system 110 can include an orchestration system 202, an evaluation system 208, a search system 210, a feedback system 212, a communication system 204, an input generation system 206, and a response generation model 124.

The orchestration system 202 can provide the multimodal input query 102 to an evaluation system 208. The evaluation system 208 can receive the multimodal input query 102. The evaluation system 208 can determine, based on the contents of the multimodal input query and other information, whether the multimodal input query includes sufficient information for the response generation model 124 to generate a response. The other information can be information about the user and previous interactions the user has had with the query response system. For example, the information can include previous information provided by the user and information available to the response generation model 124. If the evaluation system 208 determines that the multimodal input query 102 includes sufficient information to generate an adequate response, the orchestration system 202 can provide the multimodal input query 102 to the input generation system 206.

In some examples, the evaluation system 208 determines that the multimodal input query does not include sufficient information to generate an adequate response. In this case, the evaluation system 208 can determine, based on the contents of the multimodal input query and information about the response generation model, the specific information that would be useful to generate a better response. In some examples, that information can be specific to the user or the multimodal input query 102. In that case, the evaluation system 208 can access the feedback system 212. The feedback system 212 can generate one or more clarification questions for the user. Once the feedback system 212 has determined one or more clarification questions, the communication system 204 can transmit the one or more clarification questions to the user computing device 130.

The user computing system 130 can, in response to receiving clarification questions, present those clarification questions to the user. Clarification questions can refer to audio or textual questions. Presenting, therefore, can include playing the question over the audio system or displaying the text on the screen. In some examples, a user computing system 130 can present one or more user interface elements that allow the user to respond to a clarification question. For example, the user can click a provided user interface button to provide an audio response to the question. In other examples, the application executing on the user computing system 130 can, in response to presenting a clarification question, activate an audio sensor to record any information provided by the user.

Once the user has responded to the clarification question, the user computing system 130 can transmit data back to the communication system 204. The communication system 204 can provide the received data to the evaluation system 208. Using the evaluation system 208, the orchestration system 202 can determine whether additional information is needed. This process can be repeated until the evaluation system 208 determines that no further clarifying questions are needed.

In some examples, the evaluation system 208 can provide one or more search prompts to a search system 210. The search system 210 can generate search queries to retrieve information determined to be missing by the evaluation system 208. The data search queries can be executed to retrieve data from one or more data stores 226. The data store 226 can include a variety of specific information not already known to the sequence processing model (e.g., information available via web search) that can be used to supplement a machine-learned model (e.g., a sequence processing model). The search queries can be executed, and the relevant data can be retrieved. The evaluation system 208 can evaluate the retrieved data and determine whether it is sufficient to generate an adequate response. This process can be repeated until the evaluation system 208 determines that the retrieved information is sufficient.

Once the evaluation system 208 has determined that the information is sufficient to generate an adequate response, the information (e.g., including the multimodal input query, any information received from the user in response to a clarification question, any information retrieved as a result of a search query executed to retrieve additional data from the data store 226, and any contextual information) can be provided to the input generation system 206. The input generation system 206 can generate a model input based on the multimodal input query, any information retrieved based on the evaluation system 208, and any contextual information necessary to adequately generate the response. The model input can be provided to the response generation model 124. The response generation model 124 can generate a model output. As discussed above, the model output can be multimodal, including image, video, text, and/or audio components. The model output can then be transmitted to the user computing system 130 for display to the user.

Figure 3:
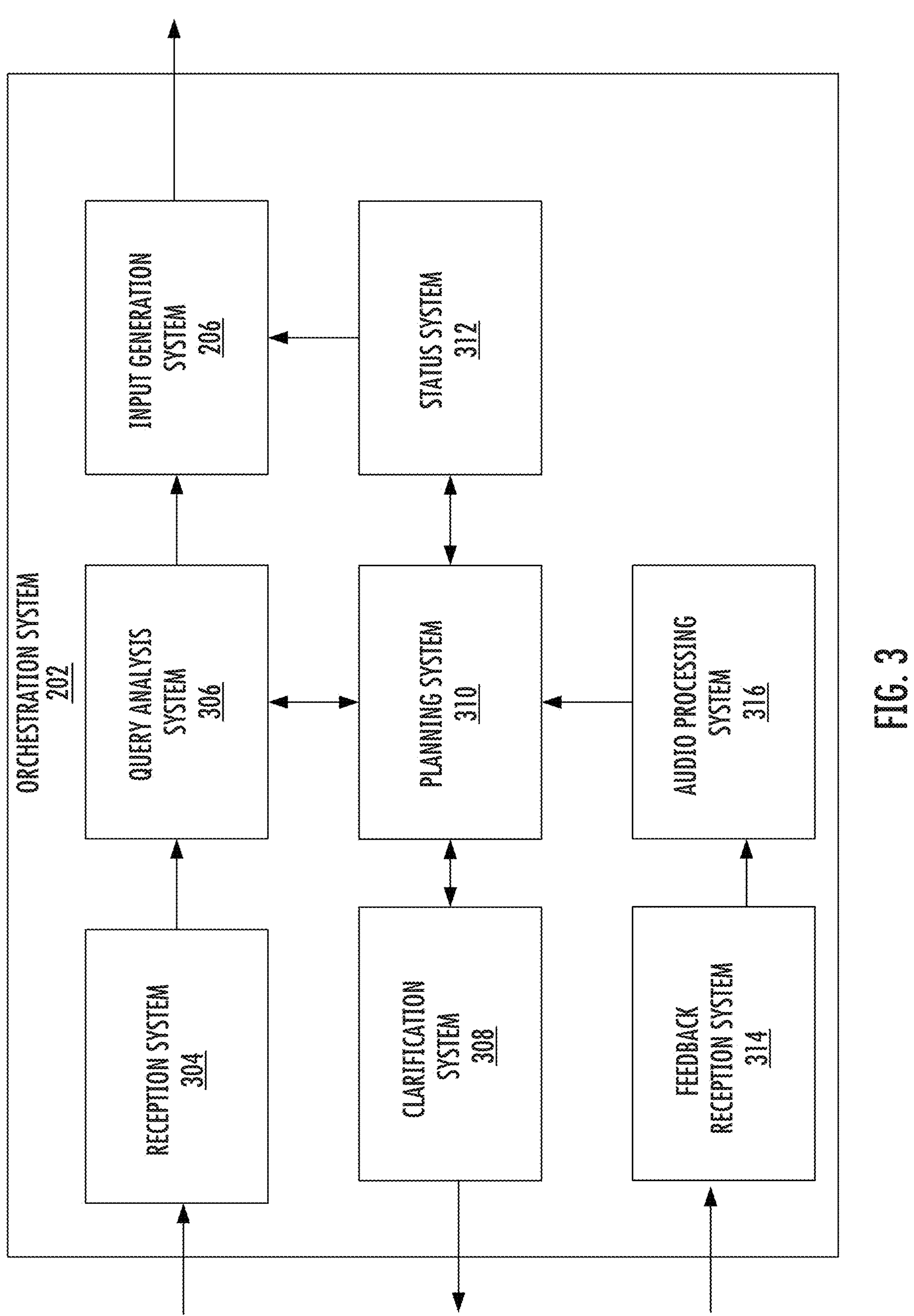
FIG. 3 depicts an orchestration system in accordance with example embodiments of the present disclosure.

FIG. 3 depicts an orchestration system 202 in accordance with example embodiments of the present disclosure. An orchestration system 202 can include a reception system 304, a query analysis system 306, a planning system 310, a clarification system 308, a planning system 310, a status system 312, an audio processing system 316, and a feedback reception system 314. In this example, the orchestration system 202 is depicted as a single system with multiple components. However, the orchestration system 202 can also be a series of individual components, each of which communicates and interacts with each other without being part of the same physical computing system. Thus, each system depicted within the orchestration system 202 may be combined or included in other systems while still providing the same essential functions. In this way, any portion of the depicted orchestration system 202 can be grouped or combined in any other way.

A reception system 304 can be a system that receives a multimodal input query. The multimodal input query can be submitted by a user from a user computing device via a computing communication network. In other examples, the orchestration system 202 can be part of a server computing system that provides and interacts with computer applications installed on user computing devices. The users can interact with an application associated with the server computing system and submit a multimodal input query via the application. The multimodal input query can then be delivered to the orchestration system 202 via the reception system 304.

Once the reception system 304 has received the multimodal input query, the multimodal input query can be provided to a query analysis system 306. In some examples, the query analysis system 306 can comprise a machine-learned classification model. The query analysis system 306 can take, as input, the multimodal input query and determine a process (e.g., one or more steps) to respond to the multimodal input query in real time.

The query analysis system 306 can provide information to a planning system 310. The planning system 310 can use information from the query analysis system 306 to determine one or more steps that need to be taken to respond adequately to the multimodal input query. The planning system 310 can determine whether the query includes sufficient information to generate an adequate response. In some examples, a multimodal input query will not provide enough information for the query response system to generate a useful response. For example, suppose the query is associated with a particular math problem. In that case, it may be difficult for the query response system to know what aspects of the math problem the user is already familiar with. As a result, a response from the query response system may not include sufficient information to explain the solution to the user (e.g., if the user is not familiar with some basic concepts) or may include too much information for concepts the user already understands. As a result, the user may not find the response useful.

The query analysis system 306, working with the planning system 310, can determine whether additional information is required. For example, a query analysis system 306 can include a machine-learned model trained to take a multimodal input query and relevant context as input and output a determination indicating whether additional information is needed. This model can be tuned based on specific situational or user requirements to be more likely or less likely to request additional information. Thus, the planning system 310 and the query analysis system 306 can determine, based on the output of a model, that more information is required. In some examples, the output from the model can indicate a specific type of information that would be required. Some information can be associated with a particular user (e.g., the user's current situation, experience, and so on) while other needed information can be associated with information available using a web search (or from other specialized databases).

If the query analysis system 306 determines that the needed information is associated with the user, the planning system 310 can generate one or more clarification queries. A clarification query can be transmitted to a user to elicit additional information about the multimodal input query. For example, clarification queries can ask the user about specific details of the query or information about the user's current status or abilities. This information may be available from the users themselves and may not be discoverable via web search or via a specialized database.

In other examples, the query analysis system 306 and/or the planning system 310 can determine that the additional information that is needed is not specific to the user but can be obtained from a web search or other specialized knowledge sources. For example, if the image includes a specific vehicle, the orchestration system 306 or the planning system 310 can determine that the query response system will need to know the specific vehicle pictured to provide the most useful answer. This information may be retrievable from a web search or from specialized knowledge databases. As a result, the planning system 310 can generate one or more queries. The queries can automatically be directed to a search system (e.g., a web search system, an image search system, a text search system, or a multimodal search system) to retrieve additional data.

The query analysis system 306 or the planning system 310 can repeat this process multiple times if necessary to ask clarification questions or retrieve information from a knowledge database until the query analysis system 306 determines that the query response system and the orchestration system 202 have sufficient information to generate an accurate and useful response.

In some examples, a status system 312 can track the current state of the process for responding to the multimodal input query. For example, the planning system 310 can generate a process for retrieving information necessary to generate a satisfactory response. If so, a status system 312 can maintain data (e.g., in a state machine) that track what parts of the process have already been completed and what steps have yet to be taken. The planning system 310 can access the information to the status system 312 to accurately track what information and steps have already been taken and what still needs to be taken. In some examples, the status system 312 can track previous portions of the live query response session (e.g., previous questions and responses) and provide that information as context for each subsequent interaction. In this way, the live query response session can have access to previous portions of the conversation when generating new responses. As a result, the interaction can feel more conversational to the user.

In some examples, a feedback reception system 314 can monitor additional audio data being received from the user computing device. For example, while in a live query response session, the user can speak, and that audio information will be collected by the audio sensor at the user computing device, with the user's permission. Audio data can be transmitted to the query response system and ultimately received by the orchestration system 202 to enable a conversation-like interaction. A feedback reception system 314 in the orchestration system 202 can then provide the audio data to an audio processing system 316 for processing. The audio processing system 316 can determine whether the audio data is noise or is otherwise irrelevant to the query response system. If so, the audio data can be discarded.

In some examples, the information received by the feedback reception system 314 can include image data. In some examples, the image data can be analyzed to determine whether it is relevant to the audio data. For example, the image data can be evaluated for image quality based on factors such as clarity, darkness, focus, and so on. Images of high quality may be more likely to be intentionally associated with the audio data. In some examples, information about the position, orientation, and direction of the user computing device (e.g., a smartphone) can be received with the image data. This position and orientation data can be used to estimate whether the image data was intentionally captured (and is therefore associated with the audio data) or not. Image data that is determined to be noise can be discarded.

In some examples, the audio processing system 316 can determine that the audio data is relevant to the live query session. For example, the feedback reception system 314 can receive the user's response to clarification questions transmitted using the clarification system 308. In addition, the user can interrupt or interject questions or comments about information received from the query response system at any point in the live communication session. If so, the feedback reception system 312 can provide that information to the audio processing system 316. The audio processing system 316 can determine what information is included in the user response and provide that information to the planning system 310. For example, if the planning system 310 has a planned clarification query for the user, but the received audio includes an answer to the clarification query, the planning system 310 can cancel the planned clarification query, and provide updated status information to the status system 312.

Once the planning system 310 and the status system 312 together have determined that all the steps needed have been completed, the query analysis system 306 can determine whether, with the received data, the orchestration system 202 has sufficient data to generate an adequate query response. Once the query analysis system 306 determines that the orchestration system 202 has sufficient data to generate a response to the multimodal input query, any additional retrieved information and any feedback from the user can be provided to the input generation system 206. Input generation system 206 can generate a model input to the sequence processing model. The input can include a rewritten prompt and other contextual data.

Figure 4:
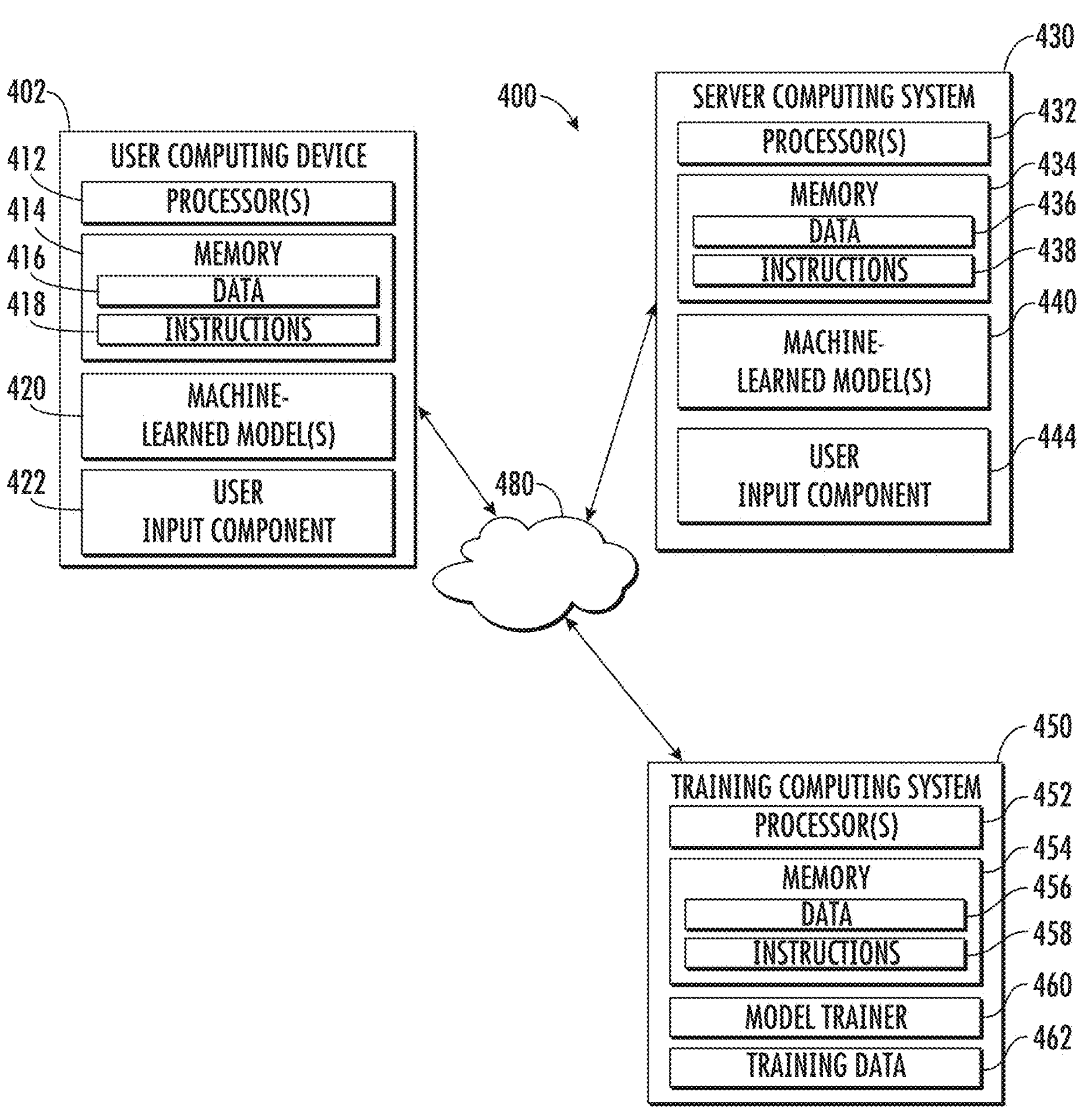
FIG. 4 depicts an example client-server environment according to example embodiments of the present disclosure.

FIG. 4 depicts a block diagram of an example user computing system 400 for responding to multimodal input queries according to example embodiments of the present disclosure. The computing system 400 includes a computing device 402, a server computing system 430, and a training computing system 450 that are communicatively coupled over a network 480.

The user computing device 402 can be any type of computing device, such as a personal computing device (e.g., laptop or desktop), a mobile computing device (e.g., smartphone or tablet), a gaming console or controller, a wearable computing device, an embedded computing device, or any other type of computing device.

The computing device 402 includes one or more processors 412 and a memory 414. The one or more processors 412 can be any suitable processing device (e.g., a processor core, a microprocessor, an ASIC, an FPGA, a controller, a microcontroller, etc.) and can be one processor or a plurality of processors that are operatively connected. The memory 414 can include one or more non-transitory computer-readable storage mediums, such as RAM, ROM, EEPROM, EPROM, flash memory devices, magnetic disks, etc., and combinations thereof. The memory 414 can store data 416 and instructions 418, which are executed by the processor 412 to cause the user computing device 402 to perform operations.

In some implementations, the computing device 402 can store or include one or more machine-learned models 420 (e.g., an orchestration model, a sequence processing model, a planning model, and/or an evaluation model). For example, the machine-learned models 420 can or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned models 420 are discussed with reference to FIGS. 8-12.

In some implementations, the one or more machine-learned models 420 can be received from a server computing system 430 over network 480, stored in the memory 414 of the computing device 402, and then used or otherwise implemented by the one or more processors 412. In some implementations, the user computing device 402 can implement multiple parallel instances of a single machine-learned model 420.

More particularly, the machine-learned model 420 (e.g., a sequence processing model) can respond to multimodal input queries in a live query response session. To do so, a query response system can initiate a live query response session in response to receiving a multimodal input query. In other examples, the live query response session is only initiated in response to a specific request from the user. The multimodal input query can include textual content and one or more media elements. As discussed above, the media elements can consist of image content, video content, audio content (e.g., recorded speech data), and interactive content.

A query response system can process the multimodal input query. In some examples, the query response system can provide the multimodal input query to an orchestration system. The orchestration system can include a large language model. The large language model can enable the query response system to provide a live query response session and interact with a user in a real-time conversational style.

In some examples, the user computing device 402 can execute a query response application. The query response application can receive input from a user and provide responses generated by a machine-learned model. For example, the machine-learned model 420 can generate the responses at the user computing device 402, a machine-learned model at a server system located remotely from the user computing device 402, or a combination of both.

The application can enable a user to capture visual data (e.g., images or a video) with the camera included in their user computing device 402 and display the captured visual data on the screen of the user computing device. The user can interact with the displayed imagery to generate a multimodal input query that is transmitted to the machine-learned model. The user can also initiate a live query response session in which a conversational interaction between the user and a machine-learned model occurs (either on the user computing device or the server computer). In a live query response session a user can submit requests and receive responses (e.g., answers or follow up questions) in real time from a sequence processing model.

The query response system can include an orchestration system to facilitate a conversation-style interaction between the user and the machine-learned model. An orchestration system can analyze a multimodal input query. One aspect of analyzing the multimodal input query is determining whether the multimodal input query includes enough information to generate an adequate response. In some examples, a classification model can generate a confidence score for the multimodal input query. The confidence score can represent the degree to which the orchestration system (e.g., an orchestration model) can provide a useful and accurate response. In some examples, the query response system can generate a provisional response, the provisional response indicating the topics expected to be covered in the actual response. Based on the multimodal input query, the classification system can determine whether the information in the multimodal input query will enable the sequence processing model to generate a response covering all expected topics from the provisional response.

If the confidence score falls below a threshold value or one or more topics cannot be generated based on an analysis of the query, the orchestration system can determine that additional information is needed to accurately respond to the multimodal inquiry. The orchestration system can employ a planning model to determine the steps necessary to receive further information and generate an adequate response.

For example, the planning system can determine a data type of the missing information. For example, data types for the missing information can include user-specific data, query-specific data, or web search data. User-specific data can refer to data that is associated with or unique to the specific user submitting the multimodal input query. For example, information about the user, including their preferences, experiences, history, and so on, can be determined to be user specific. Query-specific data can be data that is specific to the context of the current query, such as the time, manner, and place of the query, as well as information about a particular thing, place, object, or person referenced or pictured in the multimodal input query. If the multimodal query is "What is a good price for these shoes," the planning system may determine that additional context about the multimodal query is needed. For example, if the shoes are not clear enough in the picture or video to identify, the planning system may determine that the multimodal input query lacks information identifying the shoes. Web query data can be data that is best retrieved from a web search query. For example, specialized information about a particular object referenced or pictured or a particular location may not be available to a general sequence processing model. As such, the planning system can determine that a web search is needed to retrieve supplemental information.

The orchestration system can determine how to retrieve the missing information based on the data type of the missing information. In general, user-specific data can be retrieved using a clarification question presented to the user and receiving the user's response. Web query data can be retrieved by generating and executing a web search. Query-specific data can be resolved using one or a combination of: clarification questions, web search requests, or accessing topic-specific databases (e.g., an image search to identify a pictured object).

In some examples, clarification questions can be transmitted from a server computing system 430 to the user computing device 402. The user computing device 402 can then present the questions to the user. For example, the clarifying questions can be displayed in text on the screen or played (e.g., via a speaker) to the user in audio form. The user can respond to the clarifying questions (e.g., in text or vocally). If the user responds vocally, an audio sensor associated with the user computing device can detect the audio. The detected audio can be transmitted to an audio processing system associated with the query response system. This processing system can be located on the user computing device or the server computing device. The audio processing system can determine whether the captured audio is noise or is otherwise irrelevant to the clarifying question. If so, the captured audio can be discarded. However, if the captured audio is determined to be relevant to the clarifying question, the audio processing system can provide the content of the audio response to the orchestration model.

In some examples, the user can provide audio content without responding to a specific clarifying question. For example, suppose the user does not understand a portion of the instructions provided as a query response. In that case, the user can interrupt the audio that is currently playing to provide information or ask a clarifying question. As mentioned above, this information can be detected by an audio sensor and provided to an audio processing system. The audio processing system can determine whether the captured audio is relevant to the multimodal input query or the model response currently playing. If the captured audio is determined to be relevant, the captured audio can be transmitted to the orchestration system. The orchestration system can update the model response based on the received audio information.

If the missing information is associated with a web query data type, the planning system can generate additional queries to retrieve data from a web search database or knowledge store. The web search database can store a variety of documents. The documents can include specific knowledge for a wide variety of topics that can be applied to a plurality of different input queries. The web search database can return information relevant to the queries, and that information can be returned to the planning system.

Using the planning system, the orchestration system can continue to repeat this process in which the current information is evaluated to determine whether it is sufficient to respond to the multimodal input query. If not, the planning system can continue to retrieve additional information, which can include clarifying questions or web queries (or other searches of specialized databases). Once the planning system determines that the information received is sufficient, the orchestration system can use the multimodal input query, any retrieved information from clarifying questions, and any information retrieved from a knowledge database to generate a prompt that can be used as input to the sequence processing model.

The sequence processing model can generate a model output. The model output can be multimodal, including both visual components as well as textual components. In some examples, the visual components can include an image, video, or annotated image or video. The textual components can be displayed as text. Alternatively, or additionally, the text components can be converted into spoken audio. The spoken audio can be presented (e.g., played using a speaker) to the user using the user computing device 402.

In some examples, the audio content and the video content can be different but related. For example, the imagery can include depicted figures or examples, and the audio content can explain those figures or examples. In some examples, the audio data and imagery data can have associated synchronization data that can be used to ensure that the user computing device 402 can synchronize the two pieces of content appropriately. In this way, any explanation included in the audio content will be presented at the appropriate time with respect to the visual content.

In some examples, the model output can include citation information that describes the source of each piece of information included in the model output. For example, citation information can be provided in the input to the model, where citation information is used to describe a source that the user can use to verify information included in the model output. For example, the citation information can be a web page from which the passage was derived.

FIG. 4 depicts an example client-server environment 400 according to example embodiments of the present disclosure. The client-server system environment 400 includes one or more user computing systems 402 and a server computing system 430. One or more communication networks 480 can interconnect these components. The one or more communication networks 480 may be any of a variety of network types, including local area networks (LANs), wide area networks (WANs), wireless networks, wired networks, the Internet, personal area networks (PANs), or a combination of such networks.

The user computing device 402 can also include one or more user input components 422 that receive user input. For example, the user input component 422 can be a touch-sensitive component (e.g., a touch-sensitive display screen or a touchpad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 430 includes one or more processors 432 and a memory 434. The one or more processors 432 can be any suitable processing device (e.g., a processor core, a microprocessor, an ASIC, an FPGA, a controller, a microcontroller, etc.) and can be one processor or a plurality of processors that are operatively connected. The memory 434 can include one or more non-transitory computer-readable storage mediums, such as RAM, ROM, EEPROM, EPROM, flash memory devices, magnetic disks, etc., and combinations thereof. The memory 434 can store data 436 and instructions 438, which are executed by the processor 432 to cause the server computing system 430 to perform operations.

In some implementations, the server computing system 430 includes or is otherwise implemented by one or more server computing devices. In instances in which server computing system 430 includes plural server computing devices, such server computing devices can operate according to sequential computing architectures, parallel computing architectures, or some combination thereof.

As described above, the server computing system 430 can store or otherwise include one or more machine-learned models 440 (e.g., a sequence processing model, a generative model, a scoring model, an orchestration model, or other machine-learned models used by a query response system). For example, the models 440 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 440 are discussed with reference to FIGS. 8-12.

The server computing system 430 also includes a live query session system 444. The live query session system 444 can receive a request from an application on the user computing device 402. In response, the live query session system can initiate a live query session for a user to submit a multimodal input query and receive a query response. The live query session system 444 can then provide the information to and receive model responses for the machine learning model(s) 440 in real time. In addition, the live query session system 444 can asynchronously receive user feedback.

The user computing device 402 and/or a server computing system 430 can train the models 420 and/or 440 via interaction with the training computing system 450, which is communicatively coupled over the network 480. The training computing system 450 can be separate from or a portion of the server computing system 430.

The training computing system 450 includes one or more processors 452 and a memory 454. The one or more processors 452 can be any suitable processing device (e.g., a processor core, a microprocessor, an ASIC, an FPGA, a controller, a microcontroller, etc.) and can be one processor or a plurality of processors that are operatively connected. The memory 454 can include one or more non-transitory computer-readable storage mediums, such as RAM, ROM, EEPROM, EPROM, flash memory devices, magnetic disks, etc., and combinations thereof. The memory 454 can store data 456 and instructions 458 which are executed by the processor 452 to cause the training computing system 450 to perform operations. In some implementations, the training computing system 450 includes or is otherwise implemented by one or more server computing devices.

The training computing system 450 can include a model trainer 460 that trains the machine-learned models 420 and/or 440 stored at the first computing device 402 and/or the server computing system 430 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to update the parameters over a number of training iterations iteratively.

In some implementations, performing backwards propagation of errors can include performing truncated backpropagation through time. The model trainer 460 can perform a number of generalization techniques (e.g., weight decays, dropouts, etc.) to improve the generalization capability of the models being trained.

In particular, the model trainer 460 can train the query response model and an orchestration model based on a set of training data 462. The training data 462 can include, for example, example query responses, clarifying questions, generated queries, planned steps, and so on. In some examples, the model trainer 460 can use query response evaluation data (or other feedback) from an evaluation system.

The model trainer 460 includes computer logic utilized to provide desired functionality. The model trainer 460 can be implemented in hardware, firmware, and/or software controlling a general-purpose processor. For example, in some implementations, the model trainer 460 includes program files stored on a storage device, loaded into a memory and executed by one or more processors. In other implementations, the model trainer 460 includes one or more sets of computer-executable instructions that are stored in a tangible computer-readable storage medium such as RAM hard disk or optical or magnetic media.

The network 480 can be any type of communications network, such as a local area network (e.g., intranet), wide area network (e.g., Internet), or some combination thereof and can include any number of wired or wireless links. In general, communication over the network 380 can be carried via any wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases. In some implementations, the input to the machine-learned model(s) of the present disclosure can include audio data. The machine-learned model(s) can process the audio data to generate an output based on a request. As an example, the machine-learned model(s) can process the audio data and generate a response that includes audio data by extracting information from the audio data and updating or modifying it based on the request.

In some implementations, the input to the machine-learned model(s) of the present disclosure can be text or natural language data. The machine-learned model(s) can process the text or natural language data to generate an output. As an example, the machine-learned model(s) can process the natural language data to a particular multimodal input query and generate a prompt based on the multimodal input query.

As discussed above, the input to the machine-learned model(s) of the present disclosure can be speech data. The machine-learned model(s) can process the speech data to generate an output. As an example, the machine-learned model(s) can process the speech data to generate a speech recognition output. The output of the speech recognition system can be used as input to the image generation model.

FIG. 4 illustrates an example computing system that can be used to implement the present disclosure. Other computing systems can be used as well. For example, in some implementations, the user computing device 402 can include the model trainer 460 and the training data 462. In such implementations, the model(s) 420 can be trained and used locally at the user computing device 402. In some implementations, the user computing device 402 can implement the model trainer 460 to personalize the model(s) 420 based on user-specific data.

Figure 5:
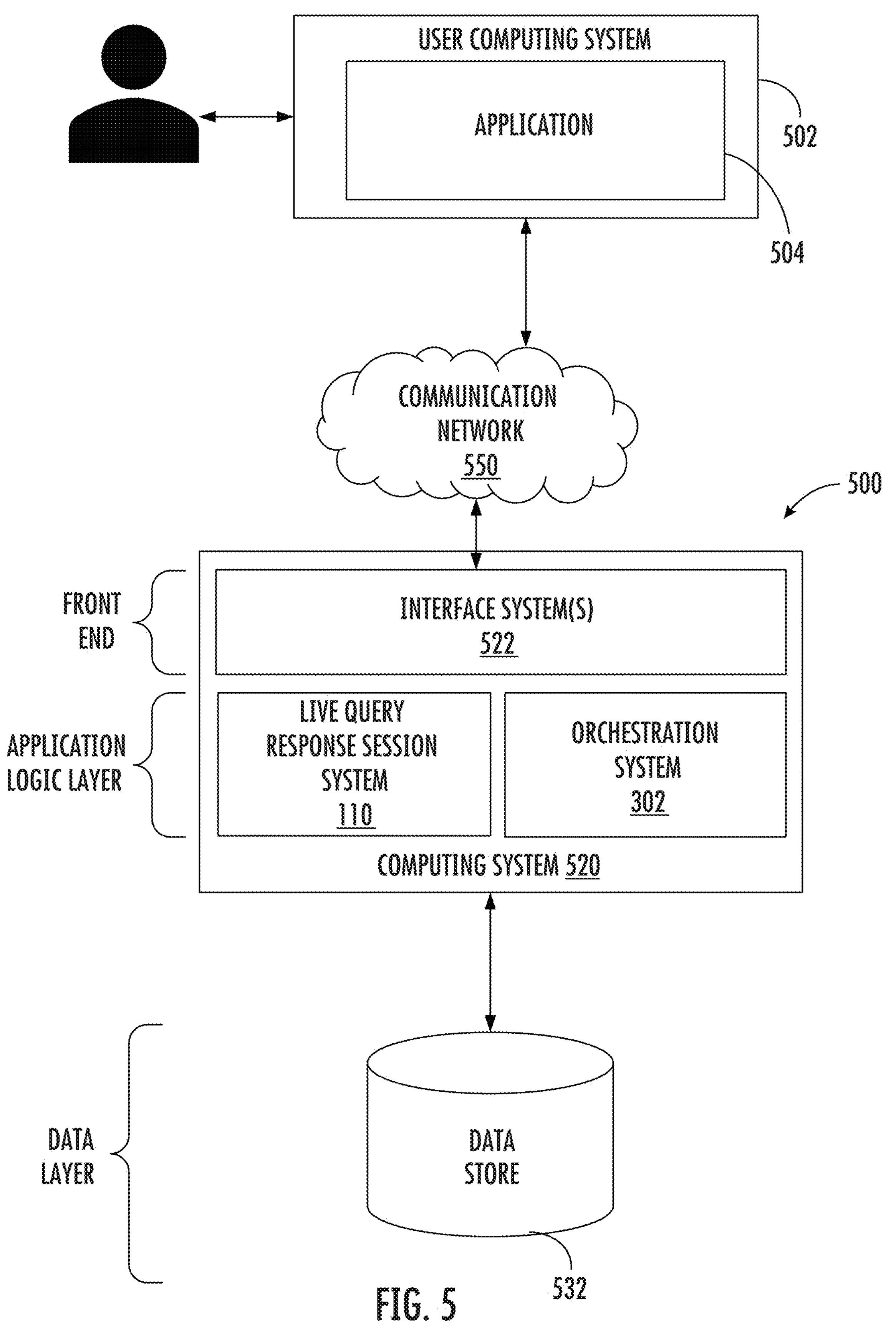
FIG. 5 depicts an example client-server environment according to example embodiments of the present disclosure.

FIG. 5 depicts an example client-server environment 500 according to example embodiments of the present disclosure. The client-server system environment 500 includes one or more user computing systems 502 and a server computing system 520. One or more communication networks 550 can interconnect these components. The one or more communication networks 550 may be any of a variety of network types, including local area networks (LANs), wide area networks (WANs), wireless networks, wired networks, the Internet, personal area networks (PANs), or a combination of such networks.

A user computing system 502 can be one of, but is not limited to, a personal computing system, a smartphone, a smartwatch, a laptop computing device, and a tablet computing system. In some examples, the user computing system 502 can include one or more application(s) 504, such as search applications, communication applications, navigation applications, productivity applications, game applications, word processing applications, or any other applications. The application(s) can include an image-based query application. The image-based query application can capture image data (e.g., images or video), display it on a screen associated with the user's computing device, and allow the user to generate queries associated with the image data. The user computing system 502 can use the image-based query application (or other applications) to send and receive requests to and from the server computing system 520. The user computing system 502 can transmit a request to the server computing system 520. The request can be a multimodal input query. The server computing system 520 can provide the multimodal input query as input to a sequence processing model and return a model response to the user computing system 502.

As shown in FIG. 5, the server computing system 520 can generally be based on a three-tiered architecture, consisting of a front-end layer, application logic layer, and data layer. As is understood by skilled artisans in the relevant computer and Internet-related arts, each component shown in FIG. 5 can represent a set of executable software instructions and the corresponding hardware (e.g., memory and processor) for executing the instructions. To avoid unnecessary detail, various components and engines that are not germane to conveying an understanding of the various examples have been omitted from FIG. 5. However, a skilled artisan will readily recognize that various additional components, systems, and applications may be used with a computing system 502, such as that illustrated in FIG. 5, to facilitate additional functionality that is not specifically described herein. Furthermore, the various components depicted in FIG. 5 may reside on a single server computer or may be distributed across several server computers in various arrangements. Moreover, although server computing system 520 is depicted in FIG. 5 as having a three-tiered architecture, the various examples of embodiments are not limited to this architecture.

As shown in FIG. 5, the front end can consist of an interface system(s) 522, which receives communications from one or more user computing system 502 and communicates appropriate responses to the user computing system 502. For example, the interface system(s) 522 may receive requests in the form of Hypertext Transfer Protocol (HTTP) requests, or other web-based application programming interface (API) requests. The user computing system 502 may be executing conventional web browser applications or applications developed for a specific platform to include any of a wide variety of computing devices and operating systems.

As shown in FIG. 5, the data layer can include a data store 532. The data store 532 can store the data used to produce search results in response to a multimodal input query. In some examples, the data store 532 can represent a plurality of distinct databases, each database storing a type of document. For example, the data store can include a plurality of documents, each indexed and/or embedded into an embedding space to allow for searchability or comparison to an input query. In some examples, the data store 532 (or a database associated with the data store 532) includes a plurality of embedded documents. Each embedded document can include information for a variety of topics. A search of the data store 532 can identify relevant documents and provide those documents to the server computing system 520.

The application logic layer can include application data that provides a wide range of other applications and services, allowing users to submit queries and receive responses. The application logic layer can include a live query response session system 110 and an orchestration system 302.

When a user computing system 502 transmits a multimodal input query to the server computing system 520, the multimodal input query can also include a request to initiate a live query response session. If so, the interface system 522 can provide the multimodal input query to the live query response session system 110. The live query response session system 110 can initiate a live query response session in which the server system provides a conversation-like interaction with the user. During the live query response session the user can provide feedback and the live query session system 110 can ask follow-up questions, provide explanations of graphics, and so on.

More specifically, the live query response session system 110 can provide the multimodal input query to the orchestration system 302. The orchestration system 302 can process the multimodal input query. In some examples, the orchestration system 302 can determine whether the sequence processing model can generate an adequate response to the multimodal input query based on the information included in the multimodal input query (and any existing context information).

In some examples, determining that the sequence processing model has sufficient information involves analyzing the multimodal input query to determine the information included in the input query. An orchestration system 302 (e.g., the orchestration model) can estimate the information that should be included in an appropriate response. The orchestration system 302 can then determine whether additional information is needed based on the multimodal input query and the estimate of what information is included in a useful or complete response.

Based on the multimodal input query, the orchestration model can also determine whether the missing information is associated with user-specific information (e.g., information about the user specifically or about the query itself) or is associated with information that can be retrieved via a web search. When the information is determined to be user-specific or query-specific, the orchestration system 302 can generate one or more clarification questions. The clarification questions can include a prompt designed to elicit additional information from the user that responds to one or more missing pieces of information. For example, the missing information can be associated with the user's current level of understanding, the user's history, the specific contents or context of the multimodal input query, and so on.

Using the interface system(s) 522, the orchestration system 302 can transmit clarification questions to the user computing system 502. The user computing system 502 can receive the clarifying questions from the server computing system 520. Once the user computing system 502 has received the clarifying questions, the user computing system 502 can present them to the user. Presenting clarifying questions to the user can include generating an audio representation of the clarifying question and playing the audio representation using a speaker associated with the user computing system 502. In other examples, clarifying questions can be displayed in text.

The user computing device can enable the user to provide feedback to the server computing system. For example, the user can speak or enter text, and the user computing device can record this information. In some examples, the user input is asynchronous and not prompted by a particular question from the server computing system. In this case, captured sound or input can be analyzed to determine whether it is relevant to the current query response session. If the captured audio data is determined to be relevant, the audio data (or other input) can be transmitted to the server computing system 520. The server computing system 520 can then use this information as context for the live query response session.

In other examples, the user can respond to a clarifying question provided by the server computing system. In this example, the user computing device can activate its audio sensors or other input devices once the clarifying question is presented to the user. The audio sensor can be used to capture any response from the user. This information can be analyzed and provided to the server computing system in response to the clarifying question.

In some examples, the orchestration system 302 determines that the missing information is not user-specific and can be retrieved via a web search or a search of a stored knowledge base. In this example, the orchestration system 302 can generate one or more subqueries. Each subquery can be directed towards retrieving additional information needed to respond adequately to the multimodal input query. The subqueries can be executed, search results can be retrieved, and the orchestration system 302 can again determine whether the sequence processing model has sufficient information for responding to the multimodal input queries. This process can be repeated until the orchestration system 302 determines that the information retrieved is enough to generate an adequate response.

Once the orchestration system 302 determines that the information is adequate, the orchestration system 302 can generate an input prompt to the sequence processing model. The input prompt can include the multimodal input query, any rewritten portion of the query, any information retrieved through clarifying questions or search queries, and any relevant contextual information. The model input can be provided to the sequence processing model. The sequence processing model can generate a model output.

The model output can be transmitted to the user computing device as part of the live query response session. As before, the user computing device 502 and the application can continue to monitor user responses (with the user's express permission) and update the model output based on any responses provided. Note that the model output can be multimodal and includes text and media elements. For example, the model output can include video and audio elements. The video content can be displayed on a screen, and a speaker can play the audio content. The audio content may include an explanation of the visuals depicted in the video content. In this way, the video content and the audio content can include different but related information for presentation to the user.

Figure 6A:
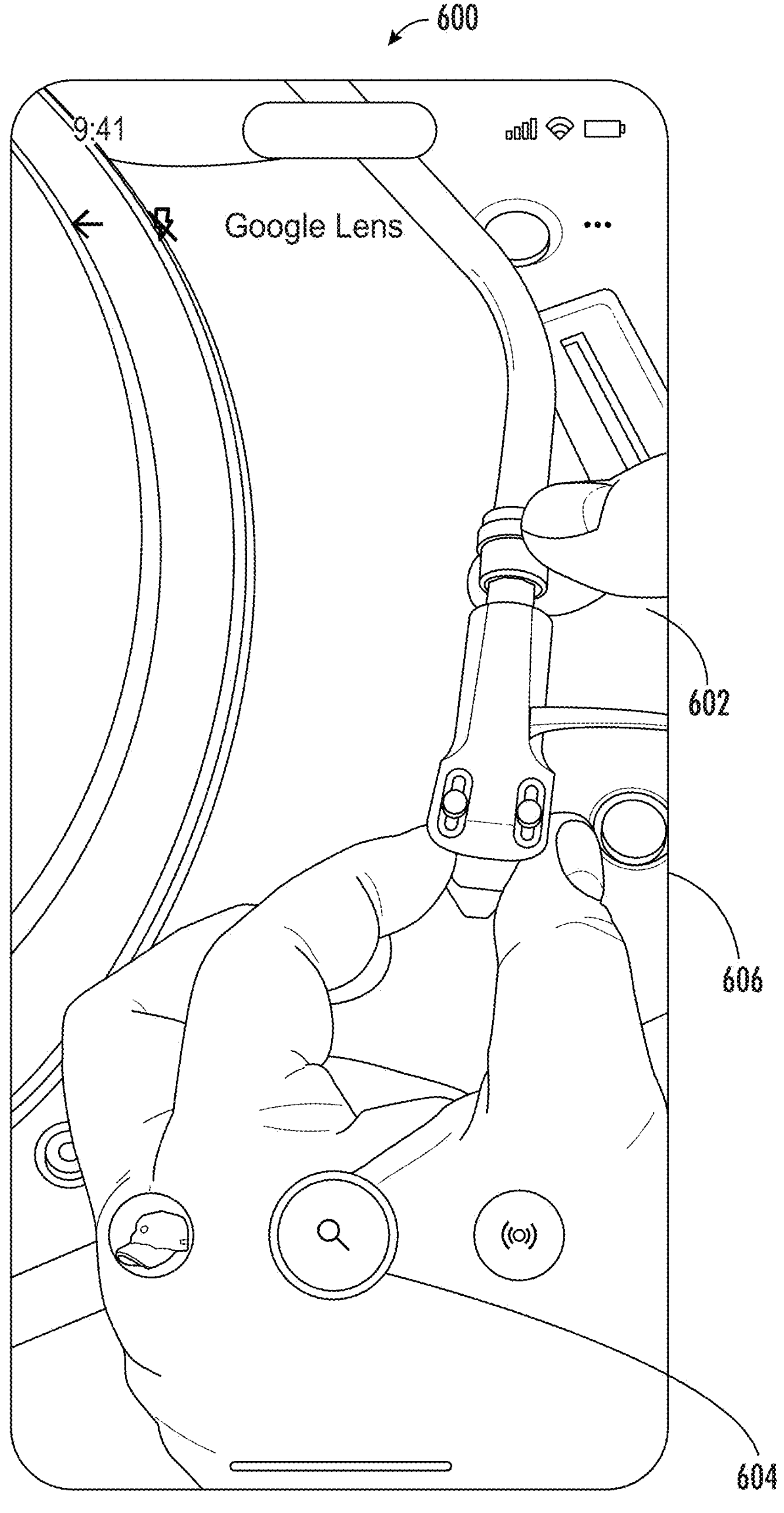
FIG. 6A depicts a user interface of an image search application in accordance with example embodiments of the present disclosure.

FIG. 6A depicts a user interface of an image search application in accordance with example embodiments of the present disclosure. In this example, an image search application 606 can be executed on a user computing device 600. The image search application 606 can display images or video captured by a camera or other image sensor included in the user computing device 600.

In this example, the image search application 606 displays imagery 602 of a record player on the screen of the user computing device 600. The user interface also includes a plurality of user interface elements. The user interface elements can include a query element 604. The query element 604, when selected, can allow a user to initiate a multimodal input query. In some examples, the query element 604 can initiate a live query response session.

Figure 6B:
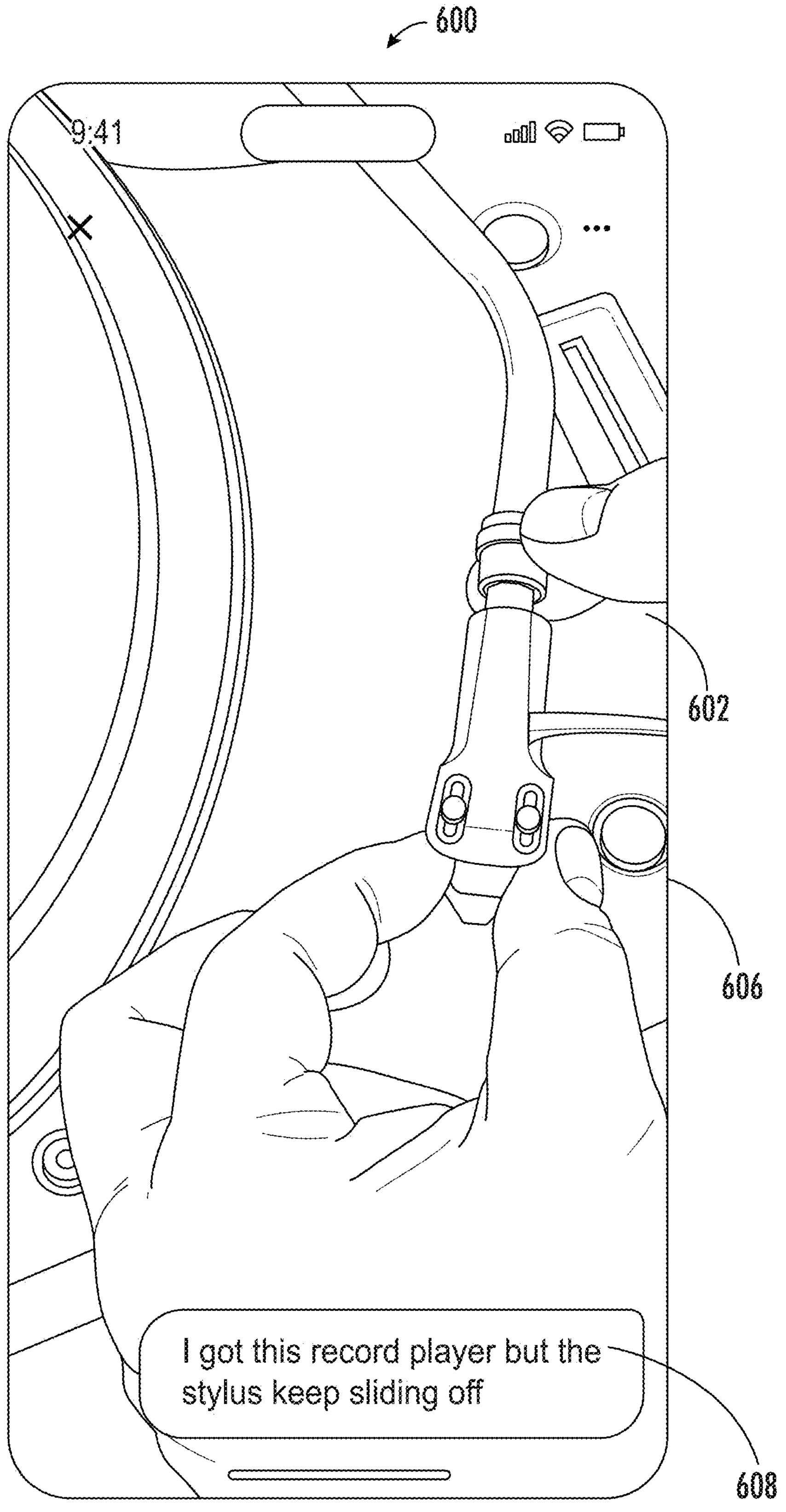
FIG. 6B depicts a user interface of an image search application in accordance with example embodiments of the present disclosure.

FIG. 6B depicts a user interface of an image search application in accordance with example embodiments of the present disclosure. In this example, an image search application 606 can be executed on a user computing device 600. The image search application 606 can display images or video captured by a camera included in the user computing device 600.

Once a user has selected a query user interface element (e.g., query element 604 in FIG. 6A), the user computing system 600 can activate an audio sensor (e.g., a microphone) included in the user computing device 600 to capture audio provided by a user. In this example, the audio captured is a query 608 from the user that reads, "I got this record player, but the stylus keeps sliding off." Alternatively, the user can enter a query using a text input interface (e.g., a keyboard).

Once the user has finished inputting their query, the image search application 606 can generate a multimodal input query. The multimodal input query can include the text of a query 608 (either in text or audio form) and a portion of the video currently displayed in the image search application 606 interface. In some examples, the user computing device can evaluate both the input audio (or text) and one or more frames of the video to determine whether it is relevant to an ongoing live query response session. Audio or video frames determined to be non-relevant can be discarded.

Figure 6C:
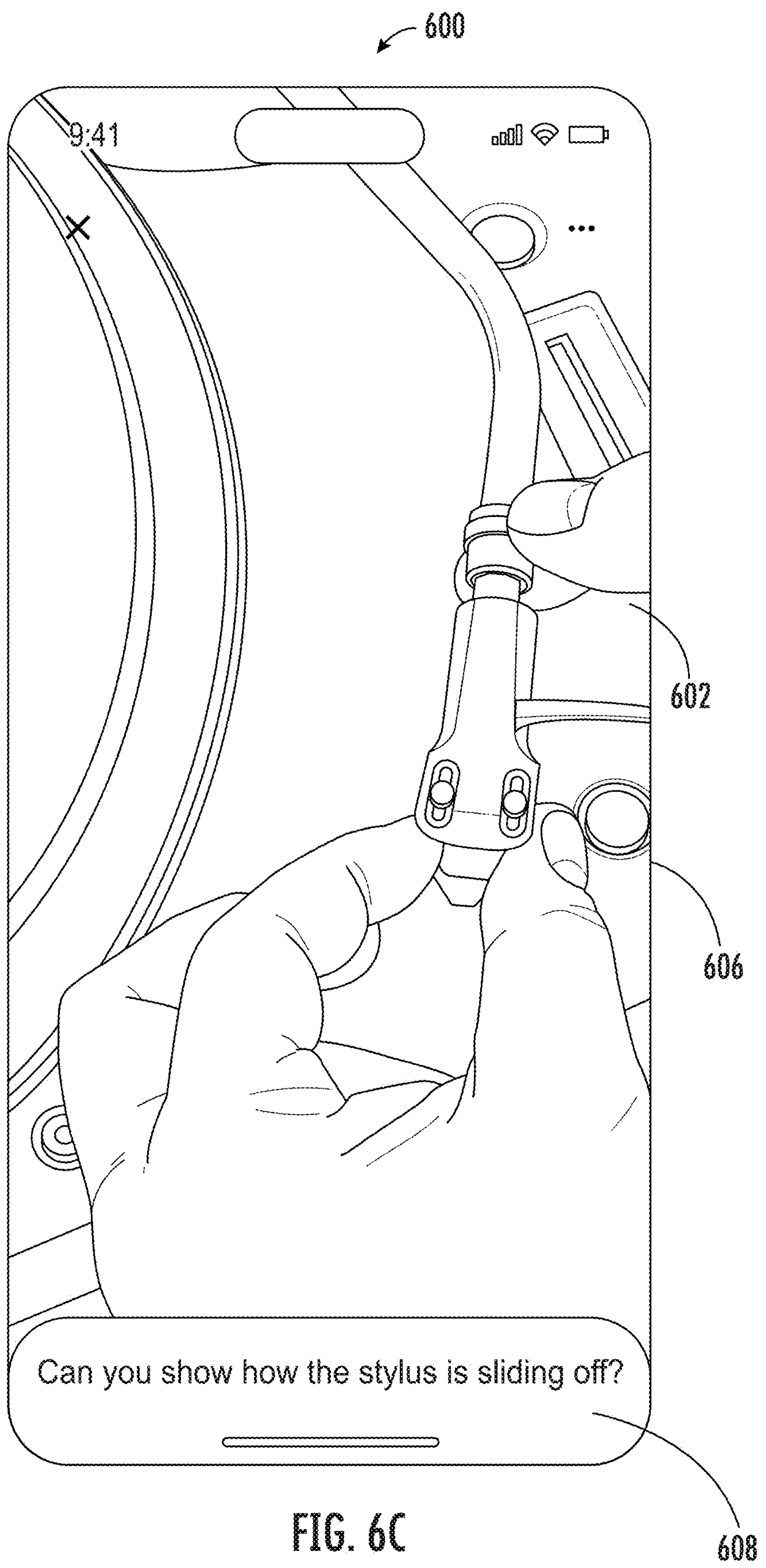
FIG. 6C depicts a user interface of an image search application in accordance with example embodiments of the present disclosure.

FIG. 6C depicts a user interface of an image search application 606 in accordance with example embodiments of the present disclosure. In this example, an image search application 606 can be executed on a user computing device 600. The image search application 606 can display images or video 602 captured by a camera included in the user computing device 600.

Once a user has provided a query and the query has been provided to the query response system via the image search application, the query response system can analyze the multimodal input query. The query response system can determine that more information is needed to adequately respond to the multimodal input query. In this case, the query response system can provide one or more clarifying questions. A clarifying question can be a prompt for additional information about the query or the user. The clarifying question can be presented to the user.

In some examples, the clarifying question can be presented as audio, text, or both. In this example, the clarifying question 610 can be, "Can you show me how the stylus is sliding off?" This question is displayed in a particular portion of the user interface. The user can respond to the clarification question by taking actions visible in the video (e.g., showing how the stylus slides), with spoken audio, or written text.

Figure 6D:
FIG. 6D depicts a user interface of an image search application in accordance with example embodiments of the present disclosure.
Figure 6D:
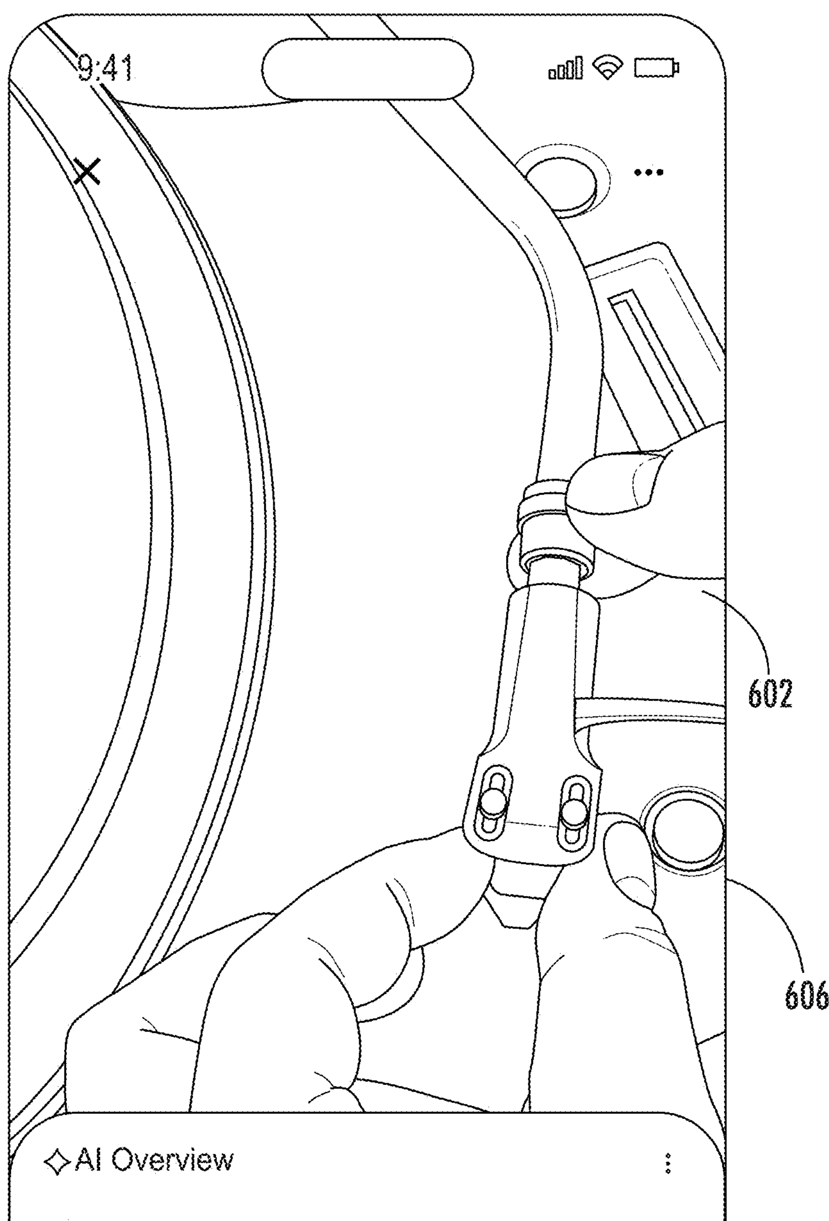

FIG. 6D depicts a user interface of an image search application 606 in accordance with example embodiments of the present disclosure. In this example, an image search application 606 can be executed on a user computing device 600. The image search application 606 can display images or video 602 captured by a camera included in the user computing device 600.

Once a user has provided a query and the query has been provided to the query response system via the image search application, the query response system can provide a query response to the multimodal input query. The query response can include a natural language response to the query. In this example, the response 612 can include information describing potential solutions to the problem with the record player.

Figure 6E:
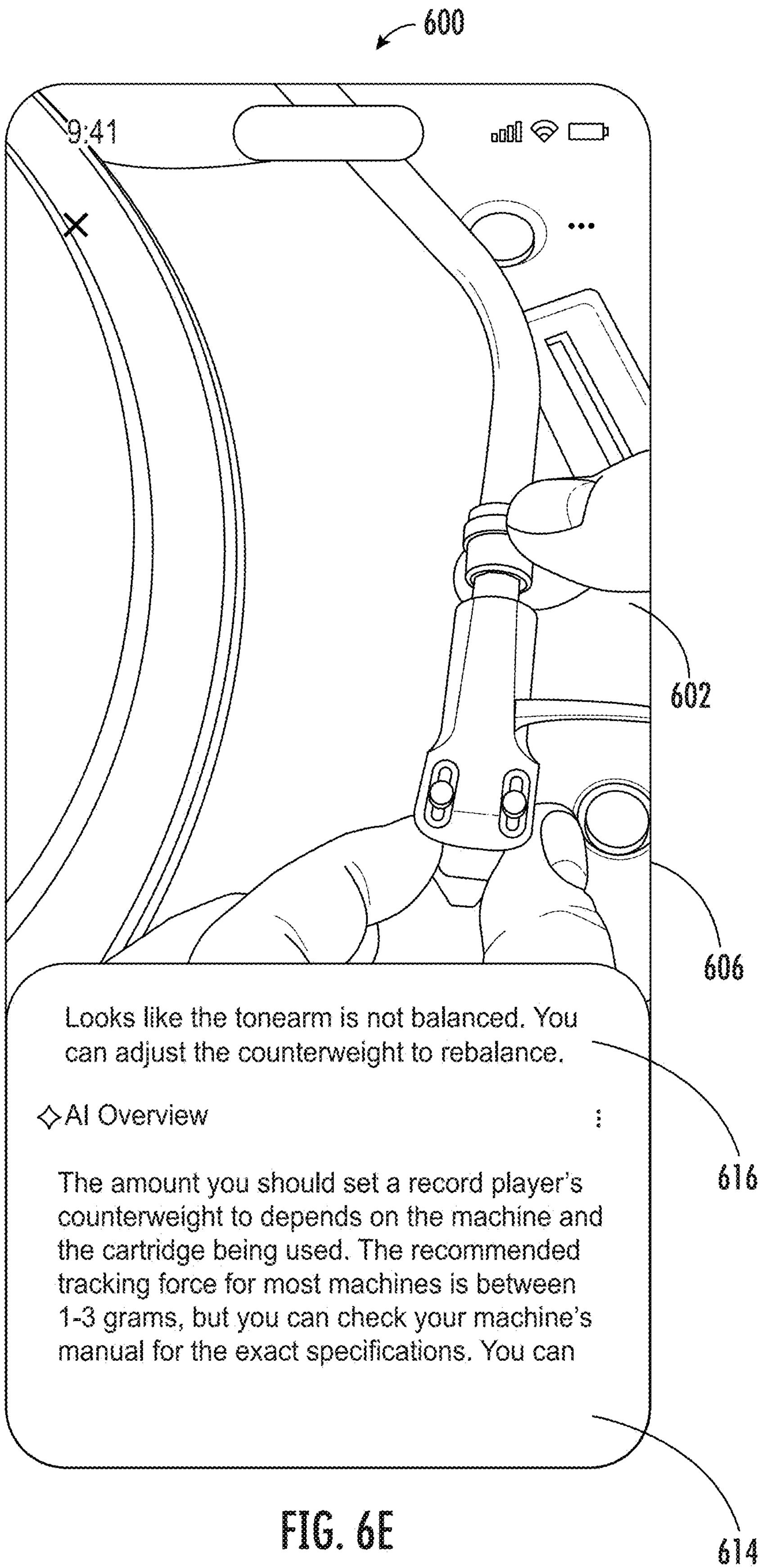
FIG. 6E depicts a user interface of an image search application in accordance with example embodiments of the present disclosure.

FIG. 6E depicts a user interface of an image search application 606 in accordance with example embodiments of the present disclosure. In this example, an image search application 606 can be executed on a user computing device 600. The image search application 606 can display images or video 602 captured by a camera included in the user computing device 600.

Once a user has provided a query and the query has been provided to the query response system via the image search application, the query response system can provide a query response to the multimodal input query. In this example, the query response includes a brief explanation 616 of a solution to the problem. Additionally, the response 616 can include information in an AI overview 614 describing potential solutions to the potential problem with the record player.

Figure 7:
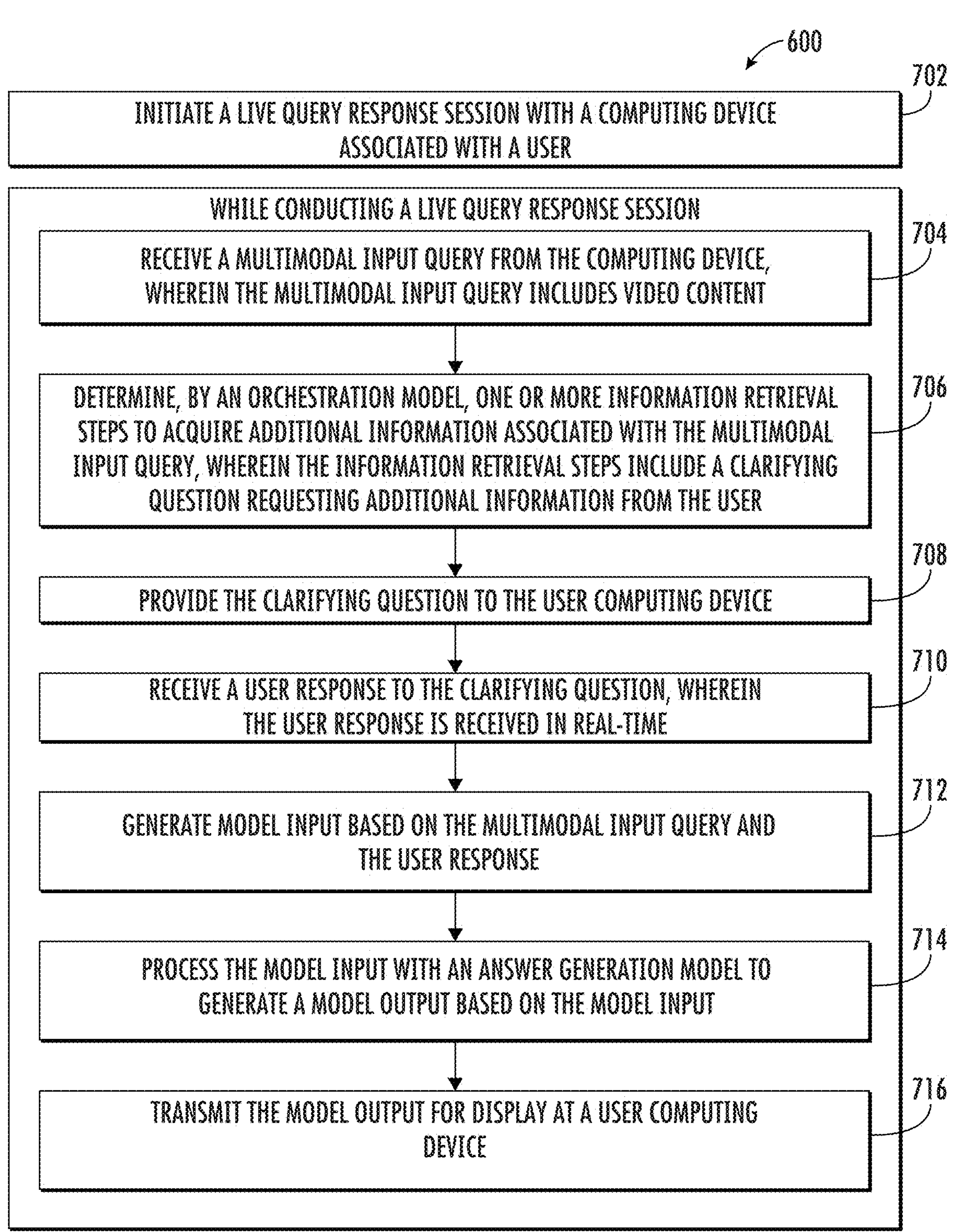
FIG. 7 is a flow diagram representing a process for conducting a live query response session in accordance with example embodiments of the present disclosure.

FIG. 7 is a flow diagram representing a process for conducting a live query response session in accordance with example embodiments of the present disclosure. The process can be performed by a computing system. The computing system can comprise one or more processors and one or more non-transitory computer-readable media that store instructions. In some examples, initiate a live query response session with a computing device associated with a user. The query response system can initiate the live query response session in response to the request to initiate the session.

While conducting the live query response session, the query response system can, at 704, receive a multimodal input query from the computing device, wherein the multimodal input query includes video content. In some examples, the multimodal input query includes textual content or speech content. For example, a user can speak their query text and an audio sensor (e.g., a microphone) can capture audio data representing the query. This audio data can be processed to identify the text of the user's query.

The query response system can, at 706, determine, by an orchestration model, one or more information retrieval steps to acquire additional information associated with the multimodal input query, wherein the information retrieval steps include a clarifying question requesting additional information from the user. Determining one or more information retrieval steps can comprise determining one or more pieces of data missing from the multimodal input query to generate a model output. For example, the orchestration model can be trained to take a multimodal input query as input and output one or more pieces of information that would be needed to generate a full and accurate response. For example, the orchestration model can determine that, to customize a response to a user, the query response system should first determine a user's level of proficiency with the topic. In this way, the generated response can focus on the aspect that the user is not familiar with rather than repeating already known information.

The query response system can determine, using the orchestration model, a data type for each piece of data missing from the multimodal input query. The data types can include user specific data, query specific data, and web query data. User specific data can be data associated with the user, their history, their proficiency, and so on. In general, a piece of data can be determined to be user specific data if that piece of data is most easily provided by the user themselves (e.g., when the user wishes to provide it). For example, if the user asks for shoe recommendations, the query response system may determine that the user's shoe size has a user specific data type.

A query specific data type can be pieces of data that are associated with the particular query. For example, if an object is pictured in a video provided with the multimodal input query, the query response may determine that additional information about the object may be needed but are not discernable from the video alone. As a result, the query response system can determine that it is query specific data. The query response system can request additional information from the user.

A web query data type can be data that is best retrieved by a supplement web search. For example, specific data that may not be automatically available to a sequence processing system can be classified as web query data type. For example, if a particular record play needs to be repaired, information about how to repair that record player may be best obtained via a web search.

In accordance with a determination that a piece of data in the one or more pieces of data has a web query data type, the query response system can generate a search query. The query response system can execute the search query to retrieve the piece of data from a web search database. In accordance with a determination that a piece of data in the one or more pieces of data has a user specific data or query specific data type, the query response system can generate a clarification query. The query response system can, as part of the live query response session, transmit the clarification query to the user computing device for presentation to a user.

In some examples, the multimodal input query can include video data. The query response system can analyze the video data to determine one or more image characteristics associated with a respective frame in one or more frames included in the video data. The query response system can determine one or more relevant portions of the video data based on the image characteristics associated with each frame in the video data. The image characteristics can include clarity and focus of the respective frame. The image characteristics can include information describing the position and orientation of a camera at a time the respective frame was captured.

The query response system can determine, using an orchestration model, a plurality of processing steps based on the multimodal input query. Each processing step can be represented as a computing instruction. The query response system can track, using an orchestration model, a current status of a query response process. The query response system can update, using an orchestration model, the current status of the query response process after each processing step is completed.

The query response system can, at 708, provide the clarifying question to the user computing device. For example, the clarifying question can transmit the clarifying question to the user computing device during the live query response session. The user computing device can present the clarifying question to the user (e.g., playing audio including the clarifying question via a speaker in the user computing device). The query response system can, at 710, receive a user response to the clarifying question, wherein the user response is received in real-time.

The query response system can, at 712, generate model input based on the multimodal input query and the user response. The model input can be a prompt. The prompt can include the multimodal input query, the supplemental information received based on one or more clarifying questions, responses to generated search queries, and any contextual information. The query response system can, at 714, process the model input with a query response model to generate a model output based on the model input. The query response system can, at 716, transmit, by the computing system, the model output for display at a user computing device.

In some examples, the model output can comprise visual imagery and response text. The response text can comprise audio content. For example, the query response system can generate spoken audio content that can be presented to the user through a speaker of the user computing system. The model output can be formatted to cause the user computing device to display the visual imagery while presenting the audio content. In some examples, the visual imagery contains different content than the content presenting in the audio content.

While continuing to conduct the live query response session, the query response system can receive audio content from the user computing device. The query response system can determine that the audio content contains user feedback with respect to the multimodal input query.

While presenting the model output to the user via the user computing device, the query response system can receive audio data captured by an audio sensor of the user computing device. The query response system can analyze whether the audio data represents spoken user input relevant to the multimodal input query. Responsive to determining that the audio data represents spoken user input relevant to the multimodal input query, while presenting the model output to the user via the user computing device, the query response system can update the model input to include the further user feedback.

In some examples, the query response system can, while presenting the model output to the user via the user computing device and responsive to receiving audio data captured by an audio sensor of the user computing device, halt presentation of the model output. For example, if the user asks a question or provides additional feedback while the model output is being presented, the query response system can halt the response (e.g., audio, video, or both) and update the query response based on the user feedback.

Figure 8:
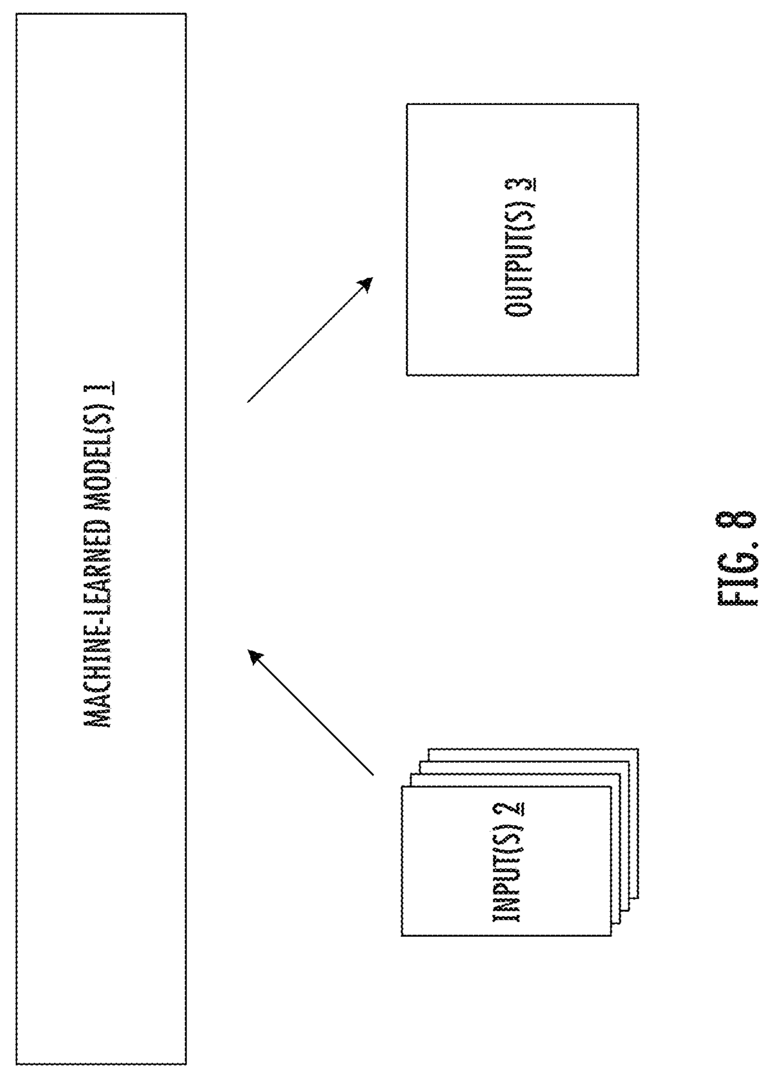
FIG. 8 is a block diagram of an example processing flow for using machine-learned model(s) to process input(s) to generate output(s)

FIG. 8 is a block diagram of an example processing flow for using machine-learned model(s) 1 to process input(s) 2 to generate output(s) 3.

Machine-learned model(s) 1 can be or include one or multiple machine-learned models or model components. Example machine-learned models can include neural networks (e.g., deep neural networks). Example machine-learned models can include non-linear models or linear models. Example machine-learned models can use other architectures in lieu of or in addition to neural networks. Example machine-learned models can include decision tree based models, support vector machines, hidden Markov models, Bayesian networks, linear regression models, k-means clustering models, etc.

Machine-learned model(s) 1 can be or include, or otherwise be representative of any one or more of the machine-learned models described above with respect to the preceding figures. For example, machine-learned model(s) 1 can be or include, or otherwise be representative of a message generation model. Although various features, variations, and implementations described below are described with respect to machine-learned model(s) 1, it is to be understood that such features, variations, and implementations are to be understood as described with respect to the message generation model, etc., any other machine-learned component described herein.

Example neural networks can include feed-forward neural networks, recurrent neural networks (RNNs), including long short-term memory (LSTM) based recurrent neural networks, convolutional neural networks (CNNs), diffusion models, generative-adversarial networks, or other forms of neural networks. Example neural networks can be deep neural networks. Some example machine-learned models can leverage an attention mechanism such as self-attention. For example, some example machine-learned models can include multi-headed self-attention models.

Machine-learned model(s) 1 can include a single, or multiple instances of the same model configured to operate on data from input(s) 2. Machine-learned model(s) 1 can include multiple different models or multiple different model portions configured to operate on data from input(s) 2.

Machine-learned model(s) 1 can include an ensemble of different models that can cooperatively interact to process data from input(s) 2. For example, a model ensemble can include multiple models that have different attributes (e.g., different architectures, trained with different recipes, etc.). The ensemble can output an overall output based on the individual outputs of the constituent models. In this manner, for instance, the diverse constituent models can work together to provide system-level robustness by effectively aggregating over individual strengths and weaknesses of any given model. The respective individual outputs can be combined in a weighted combination, using a voting or routing mechanism, or a learned output layer (e.g., one or more feedforward or fully-connected layers).

Machine-learned model(s) 1 can employ a mixture-of-experts structure. See, e.g., Zhou et al., Mixture-of-Experts with Expert Choice Routing, arXiv:2202.09368v2 (Oct. 14, 2022). For example, different portions of a model can learn (explicitly or implicitly) different expertise areas, with pathways through the model being selected by a learned routing mechanism that engages the appropriate expert for a given input (e.g., a given portion of an input, such as on a per-token basis). For example, a feedforward network can be sparsely activated for a given portion of an input based on an output of a routing mechanism that processes the portion of the input. In this manner, for instance, the group of activated weights can form an "expert" that is selected by the router. On each forward pass, only a subset of the total model weights may be engaged, thereby decreasing a quantity of operations performed for processing a given input compared to a densely activated model. In this manner, for instance, the expressive and interpretive power of a high-parameter-count model can be achieved with more compute-efficient forward passes.

Input(s) 2 can generally include or otherwise represent various types of data. Input(s) 2 can include one type or many different types of data. Output(s) 3 can be data of the same type(s) or of different types of data as compared to input(s) 2. Output(s) 3 can include one type or many different types of data.

Example data types for input(s) 2 or output(s) 3 include natural language text data, software code data (e.g., source code, object code, machine code, or any other form of computer-readable instructions or programming languages), machine code data (e.g., binary code, assembly code, or other forms of machine-readable instructions that can be executed directly by a computer's central processing unit), assembly code data (e.g., low-level programming languages that use symbolic representations of machine code instructions to program a processing unit), genetic data or other chemical or biochemical data, image data, audio data, audio-visual data, haptic data, biometric data, medical data, financial data, statistical data, geographical data, astronomical data, historical data, sensor data generally (e.g., digital or analog values, such as voltage or other absolute or relative level measurement values from a real or artificial input, such as from an audio sensor, light sensor, displacement sensor, etc.), and the like. Data can be raw or processed and can be in any format or schema.

In multimodal inputs 2 or outputs 3, example combinations of data types include image data and audio data, image data and natural language data, natural language data and software code data, image data and biometric data, sensor data and medical data, etc. It is to be understood that any combination of data types in an input 2 or an output 3 can be present.

An example input 2 can include one or multiple data types, such as the example data types noted above. An example output 3 can include one or multiple data types, such as the example data types noted above. The data type(s) of input 2 can be the same as or different from the data type(s) of output 3. It is to be understood that the example data types noted above are provided for illustrative purposes only. Data types contemplated within the scope of the present disclosure are not limited to those examples noted above.

Figure 9:
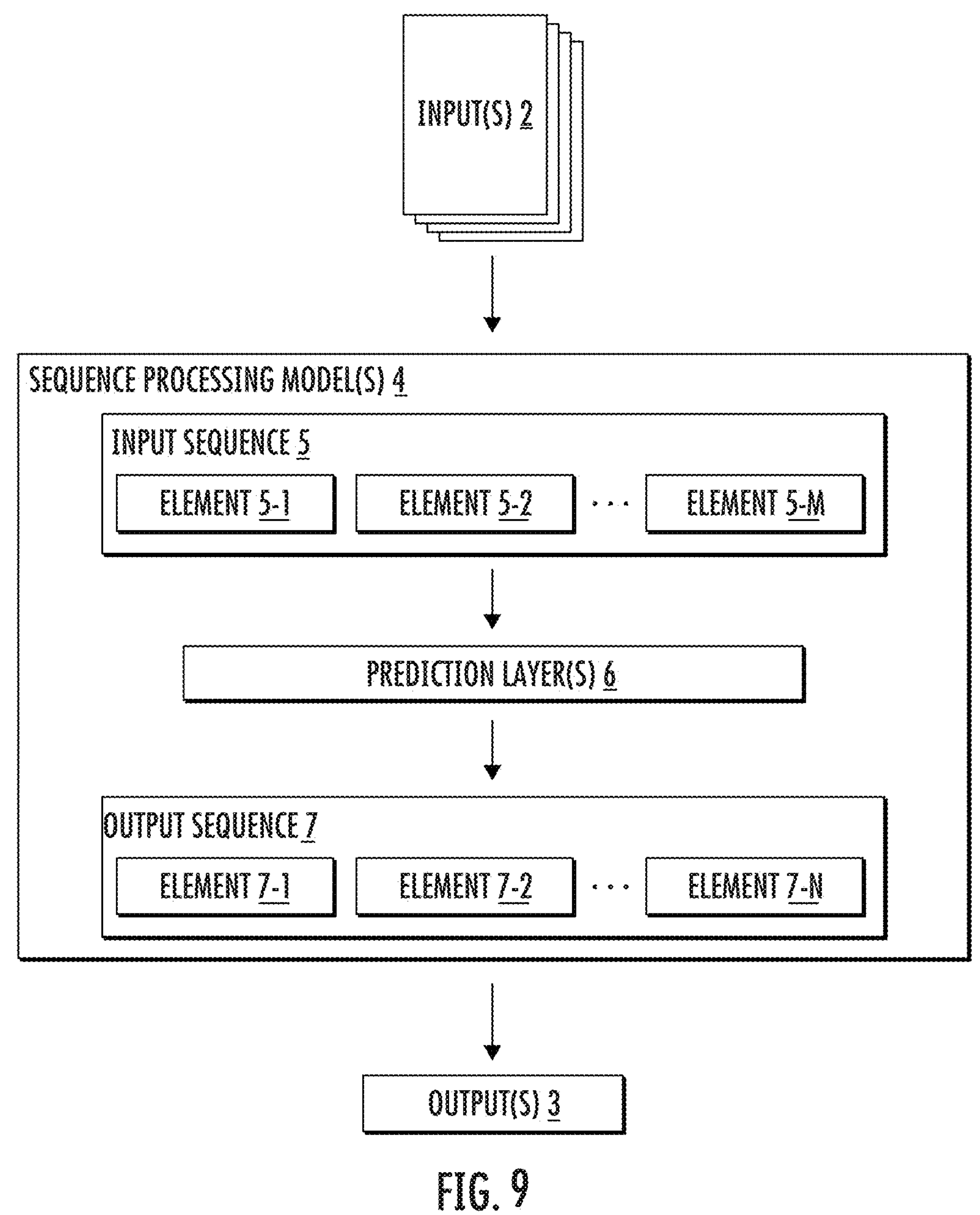
FIG. 9 is a block diagram of an example implementation of an example machine-learned model configured to process sequences of information.

FIG. 9 is a block diagram of an example implementation of an example machine-learned model configured to process sequences of information. For instance, an example implementation of machine-learned model(s) 1 can include machine-learned sequence processing model(s) 4. An example system can pass input(s) 2 to sequence processing model(s) 4. Sequence processing model(s) 4 can include one or more machine-learned components. Sequence processing model(s) 4 can process the data from input(s) 2 to obtain an input sequence 5. Input sequence 5 can include one or more input elements 5-1, 5-2, . . . , 5-M, etc. obtained from input(s) 2. Sequence processing model 4 can process input sequence 5 using prediction layer(s) 6 to generate an output sequence 7. Output sequence 7 can include one or more output elements 7-1, 7-2, . . . , 7-N, etc. generated based on input sequence 5. The system can generate output(s) 3 based on output sequence 7.

Sequence processing model(s) 4 can include one or multiple machine-learned model components configured to ingest, generate, or otherwise reason over sequences of information. For example, some example sequence processing models in the text domain are referred to as "Large Language Models," or LLMs. See, e.g., PaLM 2 Technical Report, Google, https://ai.google/static/documents/palm2techreport.pdf (n.d.). Other example sequence processing models can operate in other domains, such as image domains, see, e.g., Dosovitskiy et al., An Image is Worth 16×16 Words: Transformers for Image Recognition at Scale, arXiv:2010.11929v2 (Jun. 3, 2021), audio domains, see, e.g., Agostinelli et al., MusicLM: Generating Music From Text, arXiv:2301.11325v1 (Jan. 26, 2023), biochemical domains, see, e.g., Jumper et al., Highly accurate protein structure prediction with AlphaFold, 596 Nature 583 (Aug. 26, 2021), by way of example. Sequence processing model(s) 4 can process one or multiple types of data simultaneously. Sequence processing model(s) 4 can include relatively large models (e.g., more parameters, computationally expensive, etc.), relatively small models (e.g., fewer parameters, computationally lightweight, etc.), or both.

In general, sequence processing model(s) 4 can obtain input sequence 5 using data from input(s) 2. For instance, input sequence 5 can include a representation of data from input(s) 2 in a format understood by sequence processing model(s) 4. One or more machine-learned components of sequence processing model(s) 4 can ingest the data from input(s) 2, parse the data into pieces compatible with the processing architectures of sequence processing model(s) 4 (e.g., via "tokenization"), and project the pieces into an input space associated with prediction layer(s) 6 (e.g., via "embedding").

Sequence processing model(s) 4 can ingest the data from input(s) 2 and parse the data into a sequence of elements to obtain input sequence 5. For example, a portion of input data from input(s) 2 can be broken down into pieces that collectively represent the content of the portion of the input data. The pieces can provide the elements of the sequence.

Elements 5-1, 5-2, . . . , 5-M can represent, in some cases, building blocks for capturing or expressing meaningful information in a particular data domain. For instance, the elements can describe "atomic units" across one or more domains. For example, for textual input source(s), the elements can correspond to groups of one or more words or sub-word components, such as sets of one or more characters.

For example, elements 5-1, 5-2, . . . , 5-M can represent tokens obtained using a tokenizer. For instance, a tokenizer can process a given portion of an input source and output a series of tokens (e.g., corresponding to input elements 5-1, 5-2, . . . , 5-M) that represent the portion of the input source. Various approaches to tokenization can be used. For instance, textual input source(s) can be tokenized using a byte-pair encoding (BPE) technique. See, e.g., Kudo et al., SentencePiece: A simple and language independent subword tokenizer and detokenizer for Neural Text Processing, Proceedings of the 2018 Conference on Empirical Methods in Natural Language Processing (System Demonstrations), pages 66-71 (Oct. 31-Nov. 4, 2018), https://aclanthology.org/D18-2012.pdf. Image-based input source(s) can be tokenized by extracting and serializing patches from an image.

In general, arbitrary data types can be serialized and processed into input sequence 5. It is to be understood that element(s) 5-1, 5-2, . . . , 5-M depicted in FIG. 9 can be the tokens or can be the embedded representations thereof.

Prediction layer(s) 6 can predict one or more output elements 7-1, 7-2, . . . , 7-N based on the input elements. Prediction layer(s) 6 can include one or more machine-learned model architectures, such as one or more layers of learned parameters that manipulate and transform the input(s) to extract higher-order meaning from, and relationships between, input element(s) 5-1, 5-2, . . . , 5-M. In this manner, for instance, example prediction layer(s) 6 can predict new output element(s) in view of the context provided by input sequence 5.

Prediction layer(s) 6 can evaluate associations between portions of input sequence 5 and a particular output element. These associations can inform a prediction of the likelihood that a particular output follows the input context. For example, consider the textual snippet, "The carpenter's toolbox was small and heavy. It was full of ______." Example prediction layer(s) 6 can identify that "It" refers back to "toolbox" by determining a relationship between the respective embeddings. Example prediction layer(s) 6 can also link "It" to the attributes of the toolbox, such as "small" and "heavy." Based on these associations, prediction layer(s) 6 can, for instance, assign a higher probability to the word "nails" than to the word "sawdust."

A transformer is an example architecture that can be used in prediction layer(s) 4. See, e.g., Vaswani et al., Attention Is All You Need, arXiv:1706.03762v7 (Aug. 2, 2023). A transformer is an example of a machine-learned model architecture that uses an attention mechanism to compute associations between items within a context window. The context window can include a sequence that contains input sequence 5 and potentially one or more output element(s) 7-1, 7-2, . . . , 7-N. A transformer block can include one or more attention layer(s) and one or more post-attention layer(s) (e.g., feedforward layer(s), such as a multi-layer perceptron).

Prediction layer(s) 6 can include other machine-learned model architectures in addition to or in lieu of transformer-based architectures. For example, recurrent neural networks (RNNs) and long short-term memory (LSTM) models can also be used, as well as convolutional neural networks (CNNs). In general, prediction layer(s) 6 can leverage various kinds of artificial neural networks that can understand or generate sequences of information.

Output sequence 7 can include or otherwise represent the same or different data types as input sequence 5. For instance, input sequence 5 can represent textual data, and output sequence 7 can represent textual data. Input sequence 5 can represent image, audio, or audiovisual data, and output sequence 7 can represent textual data (e.g., describing the image, audio, or audiovisual data). It is to be understood that prediction layer(s) 6, and any other interstitial model components of sequence processing model(s) 4, can be configured to receive a variety of data types in input sequence(s) 5 and output a variety of data types in output sequence(s) 7.

Output sequence 7 can have various relationships to input sequence 5. Output sequence 7 can be a continuation of input sequence 5. Output sequence 7 can be complementary to input sequence 5. Output sequence 7 can translate, transform, augment, or otherwise modify input sequence 5. Output sequence 7 can answer, evaluate, confirm, or otherwise respond to input sequence 5. Output sequence 7 can implement (or describe instructions for implementing) an instruction provided via input sequence 5.

Output sequence 7 can be generated autoregressively. For instance, for some applications, an output of one or more prediction layer(s) 6 can be passed through one or more output layers (e.g., softmax layer) to obtain a probability distribution over an output vocabulary (e.g., a textual or symbolic vocabulary) conditioned on a set of input elements in a context window. In this manner, for instance, output sequence 7 can be autoregressively generated by sampling a likely next output element, adding that element to the context window, and re-generating the probability distribution based on the updated context window, and sampling a likely next output element, and so forth.

Output sequence 7 can also be generated non-autoregressively. For instance, multiple output elements of output sequence 7 can be predicted together without explicit sequential conditioning on each other. See, e.g., Saharia et al., Non-Autoregressive Machine Translation with Latent Alignments, arXiv:2004.07437v3 (Nov. 16, 2020).

Output sequence 7 can include one or multiple portions or elements. In an example content generation configuration, output sequence 7 can include multiple elements corresponding to multiple portions of a generated output sequence (e.g., a textual sentence, values of a discretized waveform, computer code, etc.). In an example classification configuration, output sequence 7 can include a single element associated with a classification output. For instance, an output "vocabulary" can include a set of classes into which an input sequence is to be classified. For instance, a vision transformer block can pass latent state information to a multilayer perceptron that outputs a likely class value associated with an input image.

Figure 10:
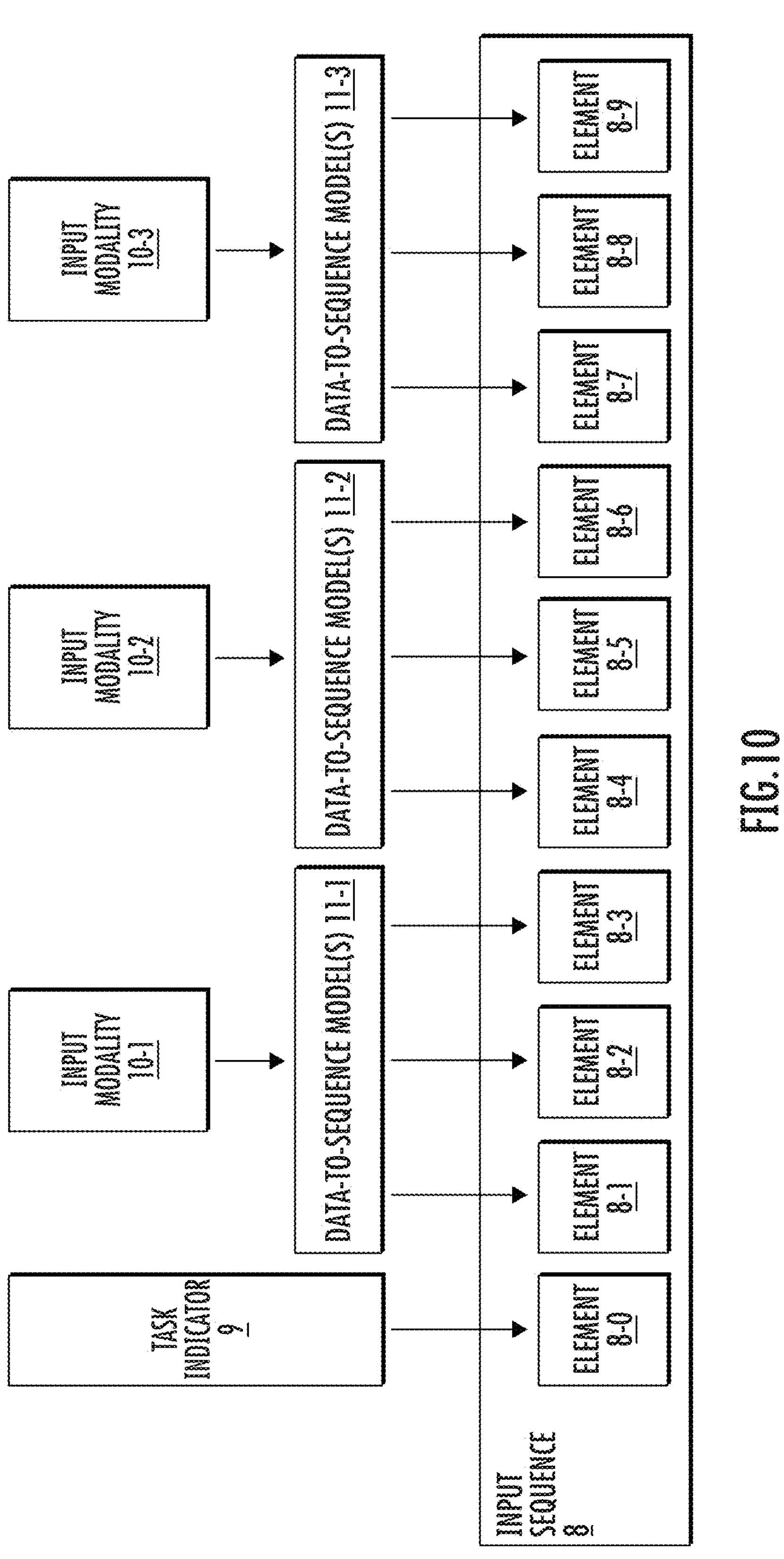
FIG. 10 is a block diagram of an example technique for populating an example input sequence.

FIG. 10 is a block diagram of an example technique for populating an example input sequence 8. Input sequence 8 can include various functional elements that form part of the model infrastructure, such as an element 8-0 obtained from a task indicator 9 that signals to any model(s) that process input sequence 8 that a particular task is being performed (e.g., to help adapt a performance of the model(s) to that particular task). Input sequence 8 can include various data elements from different data modalities. For instance, an input modality 10-1 can include one modality of data. A data-to-sequence model 11-1 can process data from input modality 10-1 to project the data into a format compatible with input sequence 8 (e.g., one or more vectors dimensioned according to the dimensions of input sequence 8) to obtain elements 8-1, 8-2, 8-3. Another input modality 10-2 can include a different modality of data. A data-to-sequence model 11-2 can project data from input modality 10-2 into a format compatible with input sequence 8 to obtain elements 8-4, 8-5, 8-6. Another input modality 10-3 can include yet another different modality of data. A data-to-sequence model 11-3 can project data from input modality 10-3 into a format compatible with input sequence 8 to obtain elements 8-7, 8-8, 8-9.

Input sequence 8 can be the same as or different from input sequence 5. Input sequence 8 can be a multimodal input sequence that contains elements that represent data from different modalities using a common dimensional representation. For instance, an embedding space can have P dimensions. Input sequence 8 can be configured to contain a plurality of elements that have P dimensions. In this manner, for instance, example implementations can facilitate information extraction and reasoning across diverse data modalities by projecting data into elements in the same embedding space for comparison, combination, or other computations therebetween.

For example, elements 8-0, . . . , 8-9 can indicate particular locations within a multidimensional embedding space. Some elements can map to a set of discrete locations in the embedding space. For instance, elements that correspond to discrete members of a predetermined vocabulary of tokens can map to discrete locations in the embedding space that are associated with those tokens. Other elements can be continuously distributed across the embedding space. For instance, some data types can be broken down into continuously defined portions (e.g., image patches) that can be described using continuously distributed locations within the embedding space.

In some implementations, the expressive power of the embedding space may not be limited to meanings associated with any particular set of tokens or other building blocks. For example, a continuous embedding space can encode a spectrum of high-order information. An individual piece of information (e.g., a token) can map to a particular point in that space: for instance, a token for the word "dog" can be projected to an embedded value that points to a particular location in the embedding space associated with canine-related information. Similarly, an image patch of an image of a dog on grass can also be projected into the embedding space. In some implementations, the projection of the image of the dog can be similar to the projection of the word "dog" while also having similarity to a projection of the word "grass," while potentially being different from both. In some implementations, the projection of the image patch may not exactly align with any single projection of a single word. In some implementations, the projection of the image patch can align with a combination of the projections of the words "dog" and "grass." In this manner, for instance, a high-order embedding space can encode information that can be independent of data modalities in which the information is expressed.

Task indicator 9 can include a model or model component configured to identify a task being performed and inject, into input sequence 8, an input value represented by element 8-0 that signals which task is being performed. For instance, the input value can be provided as a data type associated with an input modality and projected along with that input modality (e.g., the input value can be a textual task label that is embedded along with other textual data in the input; the input value can be a pixel-based representation of a task that is embedded along with other image data in the input; etc.). The input value can be provided as a data type that differs from or is at least independent from other input(s). For instance, the input value represented by element 8-0 can be learned within a continuous embedding space.

Input modalities 10-1, 10-2, and 10-3 can be associated with various different data types (e.g., as described above with respect to input(s) 2 and output(s) 3).

Data-to-sequence models 11-1, 11-2, and 11-3 can be the same or different from each other. Data-to-sequence models 11-1, 11-2, and 11-3 can be adapted to each respective input modality 10-1, 10-2, and 10-3. For example, a textual data-to-sequence model can subdivide a portion of input text and project the subdivisions into element(s) in input sequence 8 (e.g., elements 8-1, 8-2, 8-3, etc.). An image data-to-sequence model can subdivide an input image and project the subdivisions into element(s) in input sequence 8 (e.g., elements 8-4, 8-5, 8-6, etc.). An arbitrary datatype data-to-sequence model can subdivide an input of that arbitrary datatype and project the subdivisions into element(s) in input sequence 8 (e.g., elements 8-7, 8-8, 8-9, etc.).

Data-to-sequence models 11-1, 11-2, and 11-3 can form part of machine-learned sequence processing model(s) 4. Data-to-sequence models 11-1, 11-2, and 11-3 can be jointly trained with or trained independently from machine-learned sequence processing model(s) 4. Data-to-sequence models 11-1, 11-2, and 11-3 can be trained end-to-end with machine-learned sequence processing model(s) 4.

Figure 11:
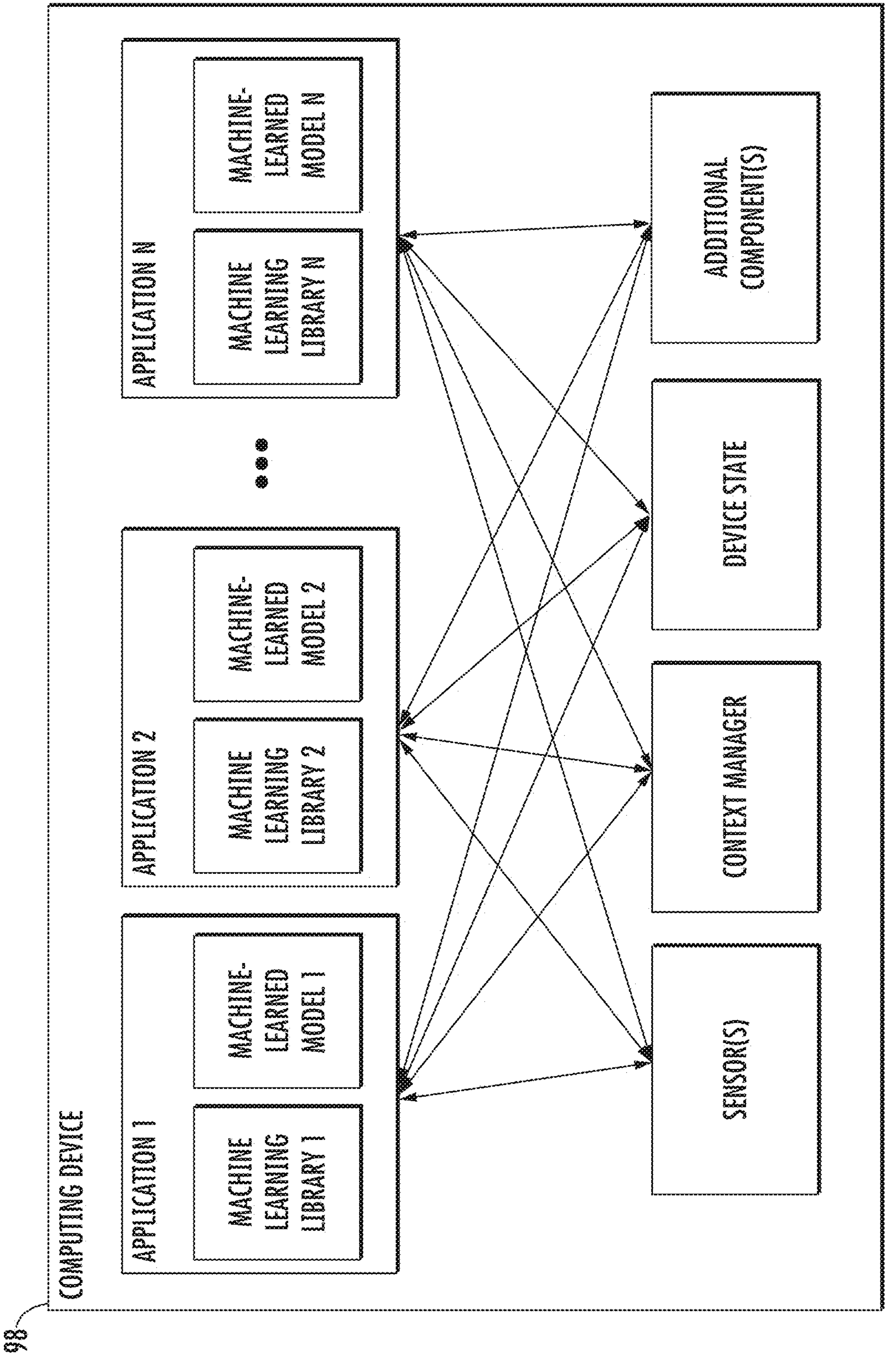
FIG. 11 is a block diagram of an example computing device that performs according to example embodiments of the present disclosure.

FIG. 11 is a block diagram of an example computing device 98 that performs according to example embodiments of the present disclosure. Computing device 98 can be a user computing device or a server computing device (e.g., computing device 50, server computing system(s) 60, etc.). Computing device 98 can implement model host 31. For instance, computing device 98 can include a number of applications (e.g., applications 1 through N). Each application can contain its own machine-learned library and machine-learned model(s). For example, each application can include a machine-learned model. Example applications include a text messaging application, an email application, a dictation application, a virtual keyboard application, a browser application, etc. As illustrated in FIG. 11, each application can communicate with a number of other components of the computing device, such as, for example, one or more sensors, a context manager, a device state component, or additional components. In some implementations, each application can communicate with each device component using an API (e.g., a public API). In some implementations, the API used by each application is specific to that application.

Figure 12:
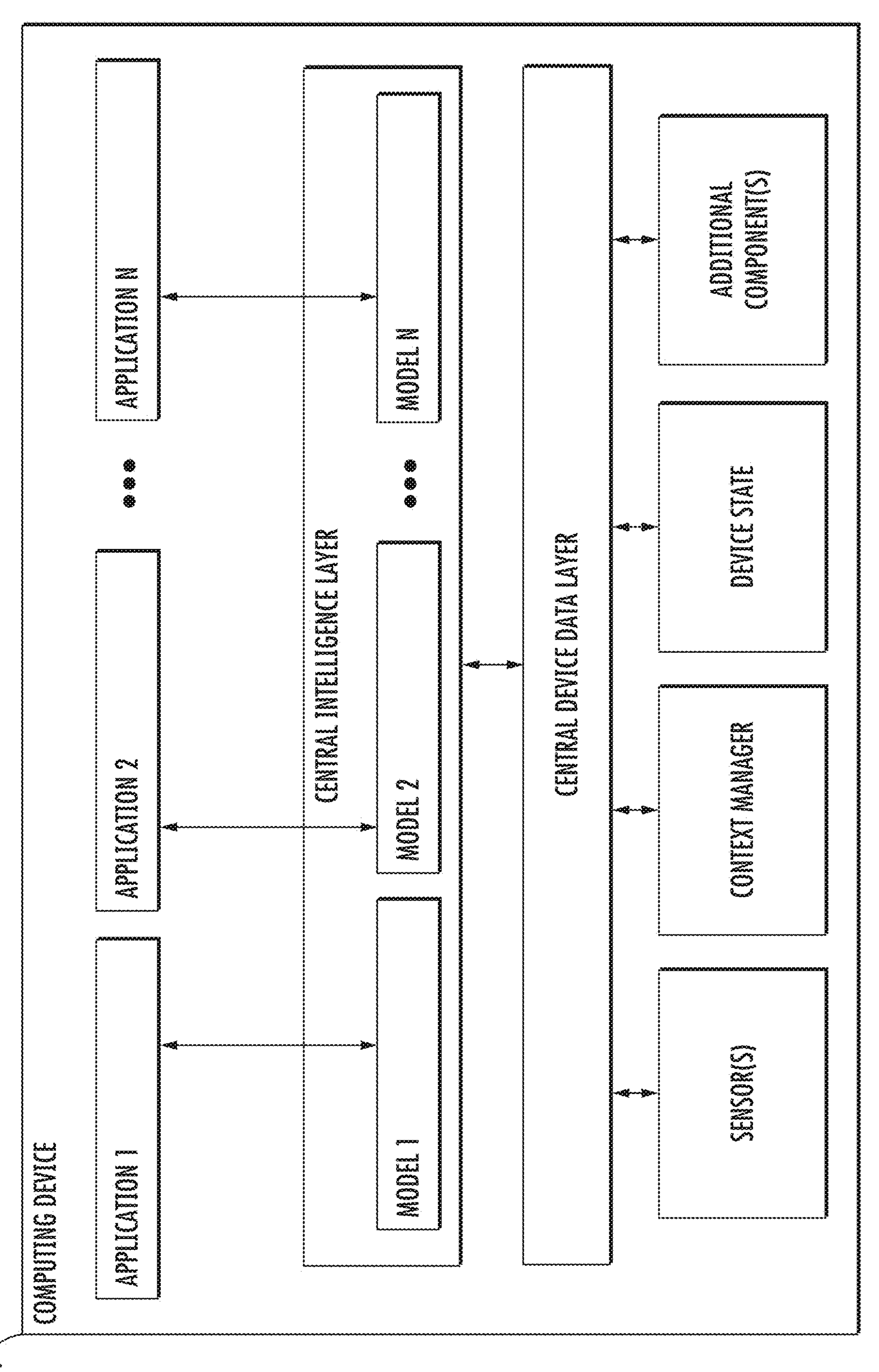
FIG. 12 is a block diagram of an example computing device that performs according to example embodiments of the present disclosure.

FIG. 12 is a block diagram of an example computing device 99 that performs according to example embodiments of the present disclosure. Computing device 99 can be the same as or different from computing device 98. Computing device 99 can be a user computing device or a server computing device (e.g., computing device 50, server computing system(s) 60, etc.). Computing device 98 can implement model host 31. For instance, computing device 99 can include a number of applications (e.g., applications 1 through N). Each application can be in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example, as illustrated in FIG. 12, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of computing device 99.

The central intelligence layer can communicate with a central device data layer. The central device data layer can be a centralized repository of data for computing device 99. As illustrated in FIG. 12, the central device data layer can communicate with a number of other components of the computing device, such as, for example, one or more sensors, a context manager, a device state component, or additional components. In some implementations, the central device data layer can communicate with each device component using an API (e.g., a private API).

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for providing a live query response session, wherein the method comprises:

initiating, by a computing system with one or more processors, a live query response session with a computing device associated with a user;

while conducting the live query response session:

receiving, by the computing system, a multimodal input query from the computing device, wherein the multimodal input query includes video content;

determining, by an orchestration model executing on the computing system, one or more information retrieval steps to acquire additional information associated with the multimodal input query, wherein the information retrieval steps include a clarifying question requesting additional information from the user;

providing, by the computing system, the clarifying question to the user computing device;

receiving, by the computing system, a user response to the clarifying question, wherein the user response is received in real-time;

generating, by the computing system, model input based on the multimodal input query and the user response;

processing, by the computing system, the model input with a query response model to generate a model output based on the model input;

transmitting, by the computing system, the model output for display at a user computing device;

receiving, by the computing device, audio content from the user computing device; and determining, by the computing device, that the audio content contains user feedback with respect to the multimodal input query.

2. The computer-implemented method of claim 1, wherein determining, by an orchestration model executing on the computing system, one or more information retrieval steps to acquire additional information associated with the multimodal input query further comprises:

determining, by the orchestration model, one or more pieces of data missing from the multimodal input query to generate a model output; and determining, by the orchestration model, a data type for each piece of data missing from the multimodal input query.

3. The computer-implemented method of claim 2, wherein the data types comprise user specific data, query specific data, and web query data.

4. The computer-implemented method of claim 3, the method further comprising:

in accordance with a determination that a piece of data in the one or more pieces of data has a web query data type:

generating, by the computing system, a search query; and executing, by the computing system, the search query to retrieve the piece of data from a web search database.

5. The computer-implemented method of claim 3, the method further comprising:

in accordance with a determination that a piece of data in the one or more pieces of data has a user specific data or query specific data type:

generating, by the computing system, a clarification query; and transmitting, by the computing system, the clarification query to the user computing device for presentation to a user.

6. The computer-implemented method of claim 3, wherein the multimodal input query comprises video data and the method further comprises:

analyzing, by the computing system, the video data to determine one or more image characteristics associated with a respective frame in one or more frames included in the video data; and determining, by the computing system, one or more relevant portions of the video data based on the image characteristics associated with each frame in the video data.

7. The computer-implemented method of claim 6, wherein the image characteristics for a respective gram include a clarity of the respective frame and a focus of the respective frame.

8. The computer-implemented method of claim 7, wherein the image characteristics include information describing a position and orientation of a camera at a time the respective frame was captured.

9. The computer-implemented method of claim 1, wherein the multimodal input query includes textual content or speech content.

10. The computer-implemented method of claim 9, the method further comprising:

determining, by the computing system using an orchestration model, a plurality of processing steps based on the multimodal input query.

11. The computer-implemented method of claim 10, wherein each processing step is represented as a computing instruction.

12. The computer-implemented method of claim 11, the method further comprising:

tracking, by the computing system using an orchestration model, a current status of a query response process; and updating, by the computing system using an orchestration model, the current status of the query response process after each processing step is completed.

13. The computer-implemented method of claim 1, wherein the model output comprises visual imagery and audio content and the model output is formatted to cause the user computing device to display the visual imagery while presenting the audio content.

14. The computer-implemented method of claim 13, wherein the visual imagery contains different content than the content presenting in the audio content.

15. The computer-implemented method of claim 1, the method further comprising, while presenting the model output to the user via the user computing device:

receiving, by the computing system, audio data captured by an audio sensor of the user computing device; and analyzing whether the audio data represents spoken user input relevant to the multimodal input query.

16. The computer-implemented method of claim 15, the method further comprising:

responsive to determining that the audio data represents spoken user input relevant to the multimodal input query, while presenting the model output to the user via the user computing device:

updating, by the computing device, the model input to include the further user feedback.

17. The computer-implemented method of claim 16, the method further comprising, while presenting the model output to the user via the user computing device:

responsive to receiving audio data captured by an audio sensor of the user computing device, halting, by the computing system, presentation of the model output.

18. A computing system, comprising:

one or more processors; and one or more non-transitory computer-readable media that store instructions wherein, when executed by the one or more processors, the instructions cause the one or more processors to perform operations, the operations comprising:

initiating a live query response session with a computing device associated with a user;

while conducting the live query response session:

receiving a multimodal input query from the computing device, wherein the multimodal input query includes video content;

determining, by an orchestration model, one or more information retrieval steps to acquire additional information associated with the multimodal input query, wherein the information retrieval steps include a clarifying question requesting additional information from the user;

providing the clarifying question to the user computing device;

receiving a user response to the clarifying question, wherein the user response is received in real-time;

generating model input based on the multimodal input query and the user response;

processing the model input with a query response model to generate a model output based on the model input;

transmitting the model output for display at a user computing device;

receiving, by the computing device, audio content from the user computing device; and determining, by the computing device, that the audio content contains user feedback with respect to the multimodal input query.

19. One or more non-transitory computer-readable media that collectively store instructions that, when executed by one or more computing devices, cause the one or more computing devices to perform operations, the operations comprising:

initiating a live query response session with a computing device associated with a user;

while conducting the live query response session:

receiving a multimodal input query from the computing device, wherein the multimodal input query includes video content;

determining, by an orchestration model, one or more information retrieval steps to acquire additional information associated with the multimodal input query, wherein the information retrieval steps include a clarifying question requesting additional information from the user;

providing the clarifying question to the user computing device;

receiving a user response to the clarifying question, wherein the user response is received in real-time;

generating model input based on the multimodal input query and the user response;

processing the model input with a query response model to generate a model output based on the model input;

transmitting the model output for display at a user computing device;

receiving, by the computing device, audio content from the user computing device; and determining, by the computing device, that the audio content contains user feedback with respect to the multimodal input query.

* * * * *